(12) United States Patent
Tanishima

(10) Patent No.: US 6,597,533 B1
(45) Date of Patent: Jul. 22, 2003

(54) RECORDING MEDIUM LOADING DEVICE

(75) Inventor: Takao Tanishima, Tokyo (JP)

(73) Assignee: TEAC Corporation, Tokyo (JP)

( * ) Notice: Subject to any disclaimer, the term of this patent is extended or adjusted under 35 U.S.C. 154(b) by 0 days.

(21) Appl. No.: 09/562,647

(22) Filed: May 1, 2000

(30) Foreign Application Priority Data

Jun. 4, 1999 (JP) .......................................... 11-158588

(51) Int. Cl.[7] .............................................. G11B 17/04
(52) U.S. Cl. ................................................. 360/99.06
(58) Field of Search .......................... 360/77.2, 99.06, 360/99.02, 99.03, 99.07; 369/77.2

(56) References Cited

U.S. PATENT DOCUMENTS 5,530,691 A * 6/1996 Fujisawa .................... 369/291
5,684,777 A * 11/1997 Fukuyama et al. ........ 369/77.2
5,815,344 A * 9/1998 Aoki ........................ 360/99.06
5,901,130 A * 5/1999 Fukuyama et al. ........ 369/77.2
6,411,584 B2 * 6/2002 Davis et al. ............... 369/77.2

FOREIGN PATENT DOCUMENTS

| JP | 08017122 A | 1/1996 |
| JP | 2978719 | 9/1999 |

* cited by examiner

Primary Examiner—George J. Letscher
Assistant Examiner—Christopher R Beacham
(74) Attorney, Agent, or Firm—Ladas & Parry

(57) ABSTRACT

A recording medium loading device includes a holder into which a cartridge containing a disk-like recording medium is inserted from a predetermined side, a cartridge retraction mechanism that retracts the cartridge when the cartridge is inserted to an insertion detection position inside the holder, and a prevent mechanism, the prevent mechanism being moved in a direction of insertion of the cartridge by the cartridge retraction mechanism when the cartridge is inserted from the predetermined side.

6 Claims, 30 Drawing Sheets

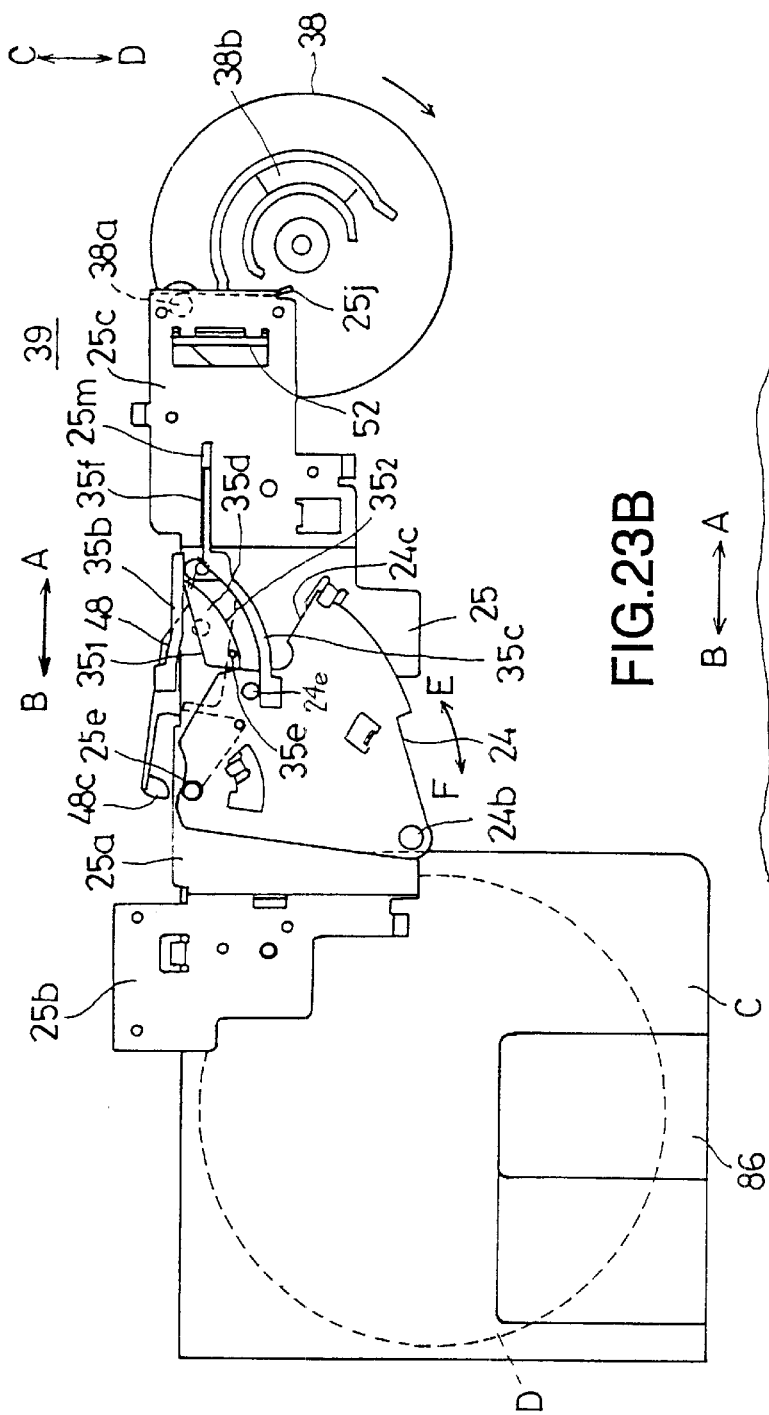
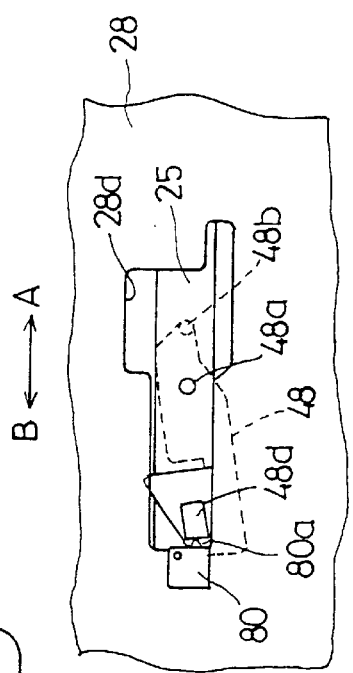
FIG.23A
FIG.23B

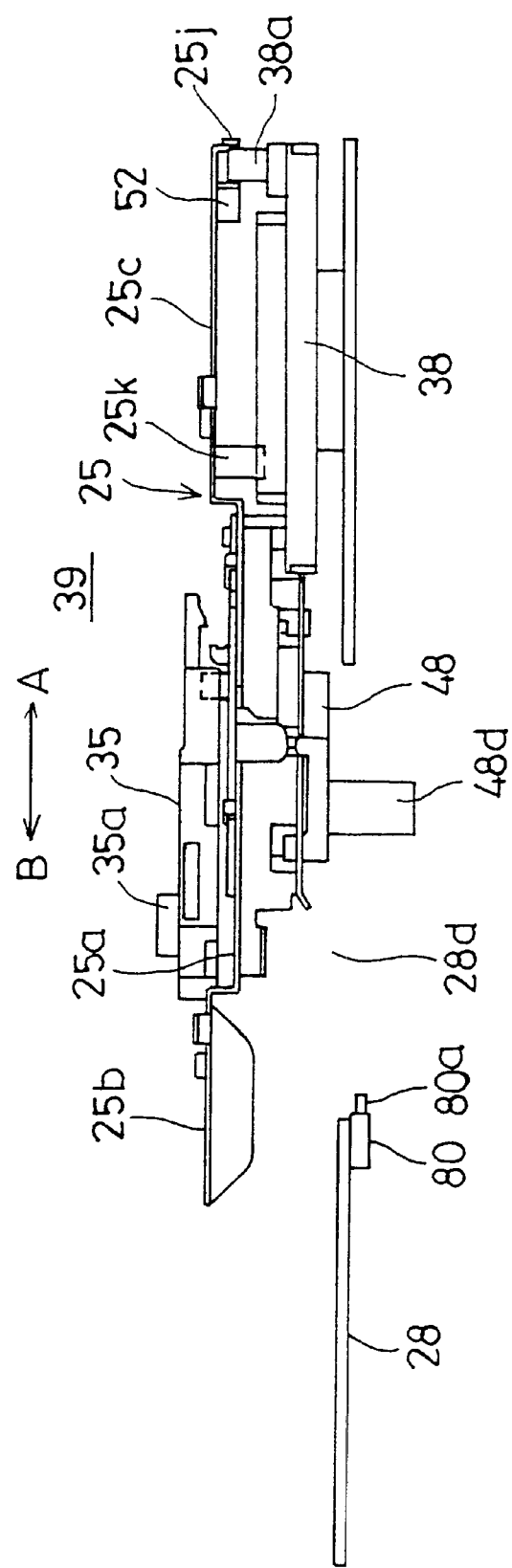

RECORDING MEDIUM LOADING DEVICE

BACKGROUND OF THE INVENTION

1. Field of the Invention

The present invention relates generally to a recording medium loading device, and more particularly, to a recording medium loading device that prevents a disk cartridge containing a recording medium from being improperly inserted into a disk cartridge holder.

2. Description of the Related Art

FIGS. 1A, 1B, 1C and 1D are diagrams for the purpose of explaining a conventional mechanism for preventing a disk cartridge from being improperly inserted into a holder, hereinafter referred to as a prevent mechanism.

The conventional recording medium loading device prevent mechanism, as shown for example in FIG. 1A, has a prevent tab 2 provided on a left interior wall of a holder 1 and a shutter drive tab 3 provided on a right interior wall of the holder 1, with the shutter drive tab 3 being positioned closer to an insertion opening 4 side than the prevent tab 2.

A disk cartridge C in which is contained a disk-like recording medium D has a shutter 6 for opening and closing an opening 5 for the purpose of exposing the disk-like recording medium D, and a shutter retaining member (not shown in the diagram) that retains the shutter 6 at a closed position. By contacting the shutter drive tab 3, the shutter retaining member releases its retention, after which the shutter drive tab 3 moves relative to the shutter 6 upon the insertion of the disk cartridge C, moving the shutter 6 to an open position.

The disk cartridge C is inserted into the holder 1 so that the shutter 6 is on the right side. In this aspect, the disk cartridge C has a groove 7 formed on a left front side thereof for accommodating the prevent tab 2 and another groove 8 formed on a right front side thereof for accommodating the shutter drive tab 6.

Additionally, the disk cartridge C has a width slightly smaller than a width L1 of the holder 1. A length L2 of the disk cartridge C is set to be slightly smaller than the holder 1 width L1, so that L1>L2.

Additionally, a length L4 from a back surface of the holder 1 to the prevent tab 2 is formed so as to be slightly shorter than a length L3 of the groove 7 in a direction of insertion, so that L3>L4.

As shown in FIG. 1B, when the disk cartridge C is inserted into the holder 1 properly, that is, in the proper direction, the prevent tab 2 advances into the groove 7 of the disk cartridge C and insertion is permitted. Additionally, the shutter drive tab 3 advances into the groove 8 of the disk cartridge C and releases the retention of the shutter 6, after which the shutter 6 begins to open as the disk cartridge C is inserted.

When the disk cartridge C reaches this position, a loading mechanism motor switch (not shown in the diagram) detects same and the loading mechanism drive motor (not shown in the diagram) is activated.

As shown in FIG. 1C, when the loading mechanism is activated and the disk cartridge C is retracted into the holder 1, the shutter 6 opens completely and the retraction of the disk cartridge C is completed, that is, the disk cartridge is loaded.

As shown in FIG. 1D, if for example the disk cartridge C is incorrectly inserted into the holder 1 so that the shutter 6 is positioned at the front edge thereof, the prevent tab 2 contacts an edge member of the disk cartridge C and makes insertion impossible. Additionally, the shutter drive tab 3 contacts a side surface of the disk cartridge C. As a result, the disk cartridge C is inserted in a state of displacement to the left within the holder 1 and the front edge securely contacts the prevent tab 2, thereby preventing insertion.

However, a disadvantage of the conventional recording medium loading device described above is that the positioning of the prevent tab 2 is restricted by the groove 7 of the disk cartridge C, that is, L4<L3, and, as a result, an improper insertion of the disk cartridge C is detected too late. That is, a distance L5 from the back wall of the holder to the front edge of the cartridge contacted by the prevent tab 2 must be less than the distance L4 because of the presence of the groove 7 on the disk cartridge C for accommodating the prevent tab 2.

Moreover, in order to prevent the loading mechanism motor described above from being activated and an incorrectly inserted disk cartridge C from being retracted into the holder 1, a position at which the cartridge begins to be retracted must be further back from the insertion opening than the position at which an incorrect insertion is detected. In other words, a distance L6 from the back wall of the holder 1 to the position at which the cartridge begins to be retracted must be less than the distance L5 from the back wall of the holder to the front edge of the cartridge contacted by the prevent tab 2, which, as noted above, must be less than the distance L4, such that L6<L5<L4.

As a result, with the conventional recording medium loading device there is the disadvantage of being unable to increase the disk cartridge C retraction distance.

Additionally, because the distance the disk cartridge C is retracted by the retraction mechanism cannot be increased, a distance L7 from the disk cartridge C insertion opening at the front of the disk drive to the front edge of the disk cartridge C when the disk cartridge C is loaded is strictly limited, so that L7<L2+L6.

As a consequence of these restrictions design flexibility as a whole is limited. Specifically, the position of the guide shafts that determine the location of the optical pick-up to be described later is strictly limited by these above-described dimensional restrictions and cannot be located freely, thus limiting the degree to which the design of the disk drive overall may be made more efficient and more compact.

Additionally, because the distance the disk cartridge C is retracted by the retraction mechanism cannot be increased, the shutter 6 opens when the disk is inserted manually and the shutter 6 retention release and opening operations triggered by the contacting of the shutter drive tab 3 are transmitted to the hand of the operator, resulting in an unpleasant sensation.

SUMMARY OF THE INVENTION

Accordingly, it is an object of the present invention to provide an improved and useful recording medium loading device in which the above-described disadvantages are eliminated.

The above-described object of the present invention is achieved by a recording medium loading device comprising:
- a holder into which a cartridge containing a disk-like recording medium is inserted from a predetermined side;
- a cartridge retraction mechanism that retracts the cartridge when the cartridge is inserted to an insertion detection position inside the holder; and a prevent mechanism, the prevent mechanism being moved in a direction of insertion of the cartridge by the cartridge retraction mechanism when the cartridge is inserted from the predetermined side.

According to the invention described above, detection of improper insertion takes place sooner and at the same time cartridge retraction can take place sooner as well. As a result, the distance of retraction from a position at which cartridge retraction commences to a position at which retraction is completed can be lengthened.

The above-described object of the present invention is also achieved by the recording medium loading device described above, further comprising:

detecting means detecting insertion of the recording medium cartridge to the insertion detection position and emitting a signal; and driving means driving the cartridge retraction mechanism and the prevent tab in response to the signal emitted by the detecting means indicating that the recording medium cartridge is inserted to the insertion detection position and displacing the cartridge retraction mechanism and the prevent tab in a direction of insertion of the recording medium cartridge.

According to the invention described above, retraction of the cartridge is performed automatically after the cartridge has reached a position at which manual insertion is completed and, at the same time, the cartridge shutter can be opened in the process of retracting the cartridge.

Other objects, features and advantages of the present invention will become more apparent from the following detailed description when read in conjunction with the accompanying drawings.

BRIEF DESCRIPTION OF THE DRAWINGS

FIGS. 23A and 23B are diagrams showing an operating state of the cartridge retraction mechanism before insertion and after ejection of a cartridge, respectively;

FIG. 29 is a diagram showing a side view of an operating state of the cartridge retraction mechanism upon completion of retraction;

DESCRIPTION OF THE PREFERRED EMBODIMENTS

A detailed description will now be given of a recording medium loading device according to one embodiment of the present invention, with reference to the accompanying drawings, in the first instance to FIGS. 2, 3 and 4.

Figure 2:
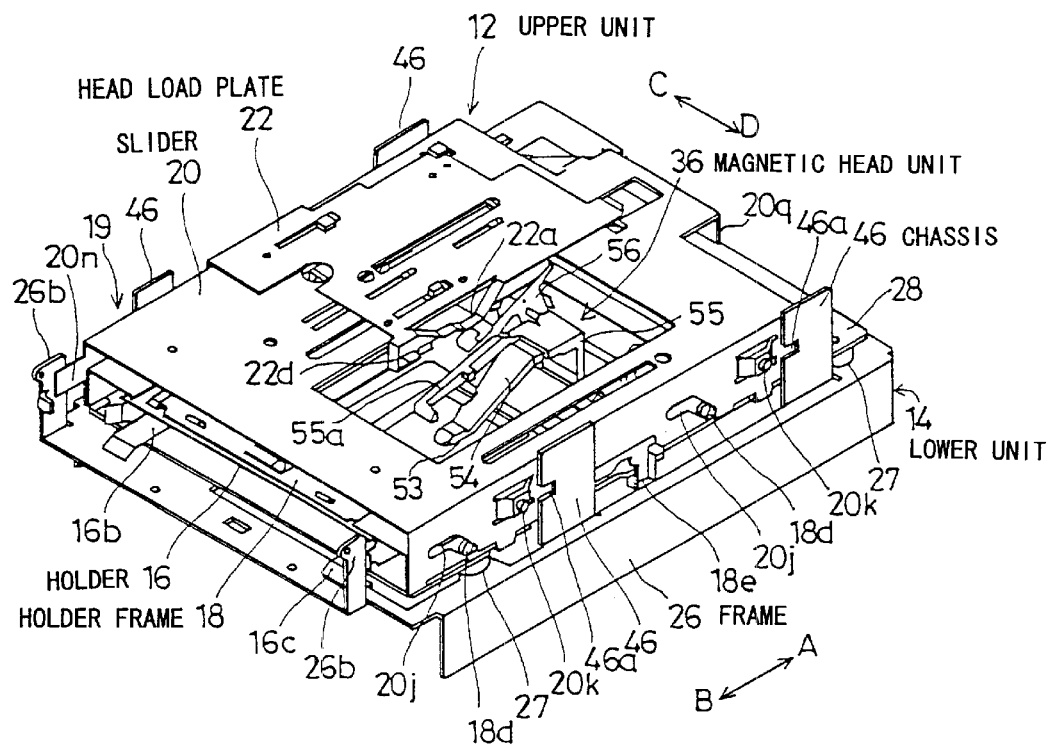
FIG. 2 is a diagram showing an oblique view of a recording medium loading device according to one embodiment of the present invention.

FIG. 2 is a diagram showing an oblique view of a recording medium loading device according to one embodiment of the present invention. FIG. 3 is a diagram showing an exploded oblique view of a recording medium loading device according to one embodiment of the present invention, in which an upper unit and a lower unit are separated. FIG. 4 is a diagram showing an exploded oblique view for the purpose of describing individual members forming the upper unit of a recording medium loading device according to one embodiment of the present invention.

Figure 3:
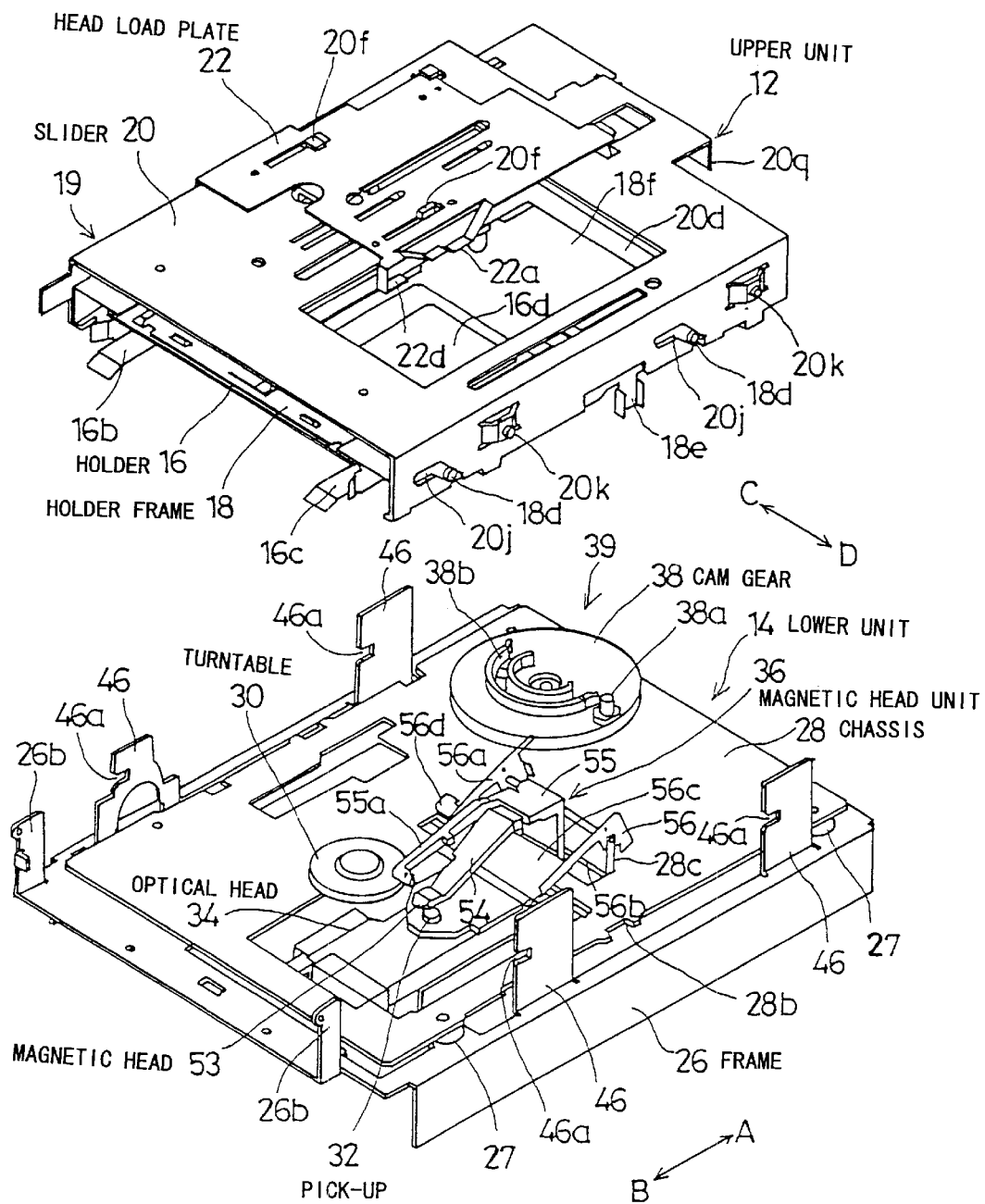
FIG. 3 is a diagram showing an exploded oblique view of the recording medium loading device according to one embodiment of the present invention, in which an upper unit and a lower unit are separated.
Figure 4:
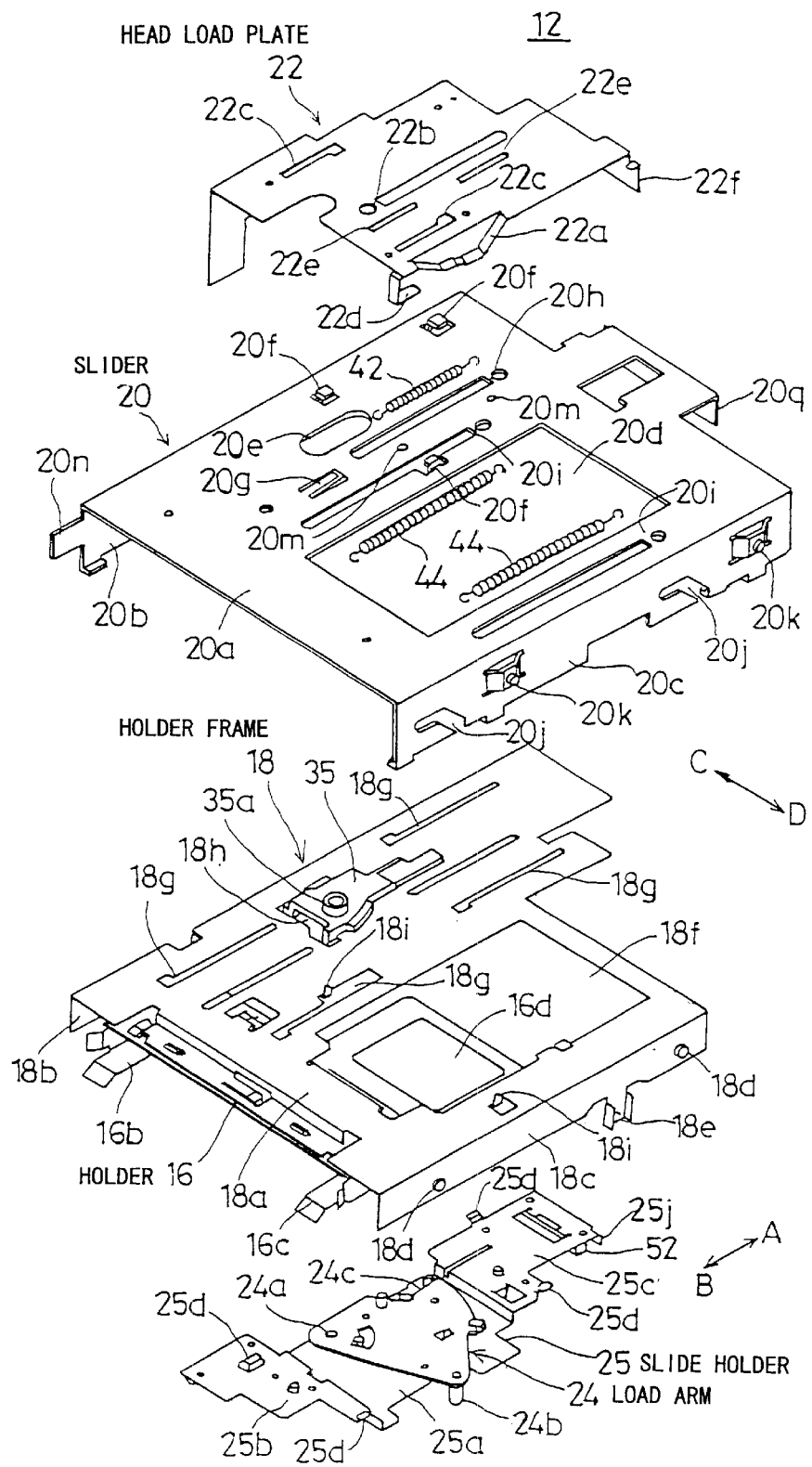
FIG. 4 is a diagram showing an exploded oblique view for the purpose of describing individual members forming the upper unit of the recording medium loading device according to one embodiment of the present invention.

As shown in FIGS. 2, 3 and 4, a recording medium loading device 11 is constructed so as to load to a loading position at which information can for example be magneto-optically recorded and/or reproduced to and from a disk-like recording medium contained in a disk cartridge C not shown in the diagram.

As shown in the diagrams, the recording medium loading device 11 chiefly comprises an upper unit 12 and a lower unit 14. The upper unit 12 comprises a holder 16 into which a disk cartridge C is inserted, a holder frame 18 supporting the holder 16, a slider 20 that guides a movement of the holder frame 18, a head load plate 22 that raises and lowers a magnetic head 53 to be described later, and a slide holder 25 that supports a load arm 24 that contacts the disk cartridge C. It should be noted that that the holder frame 18 and the slider 20 together form a recording medium transport mechanism 19.

The lower unit 14 comprises a frame 26, a chassis 28 mounted in a floating state on top of the frame 26 by a rubber insulator 27, a turntable 30 mounted on top of the chassis 28 a spindle motor not shown in the drawing that is mounted on a bottom surface side of the chassis 28 and that rotatably drives the turntable 30, an optical head 34 having an optical pick-up 32 provided so as to be movable in a lateral direction indicated by arrows C, D in the drawing along the bottom surface of the chassis 28, a magnetic head unit 36 mounted on the optical head 34 and a cam gear 38 driven by a drive motor 62 to be described later.

It should be noted that the load arm 24 and the slide holder 25 and the cartridge hook 48 to be described later together comprise a cartridge retraction mechanism 39 that retracts a disk cartridge C inserted into the holder 16.

A description will now be given of the individual members forming the upper unit 12.

Figure 5:
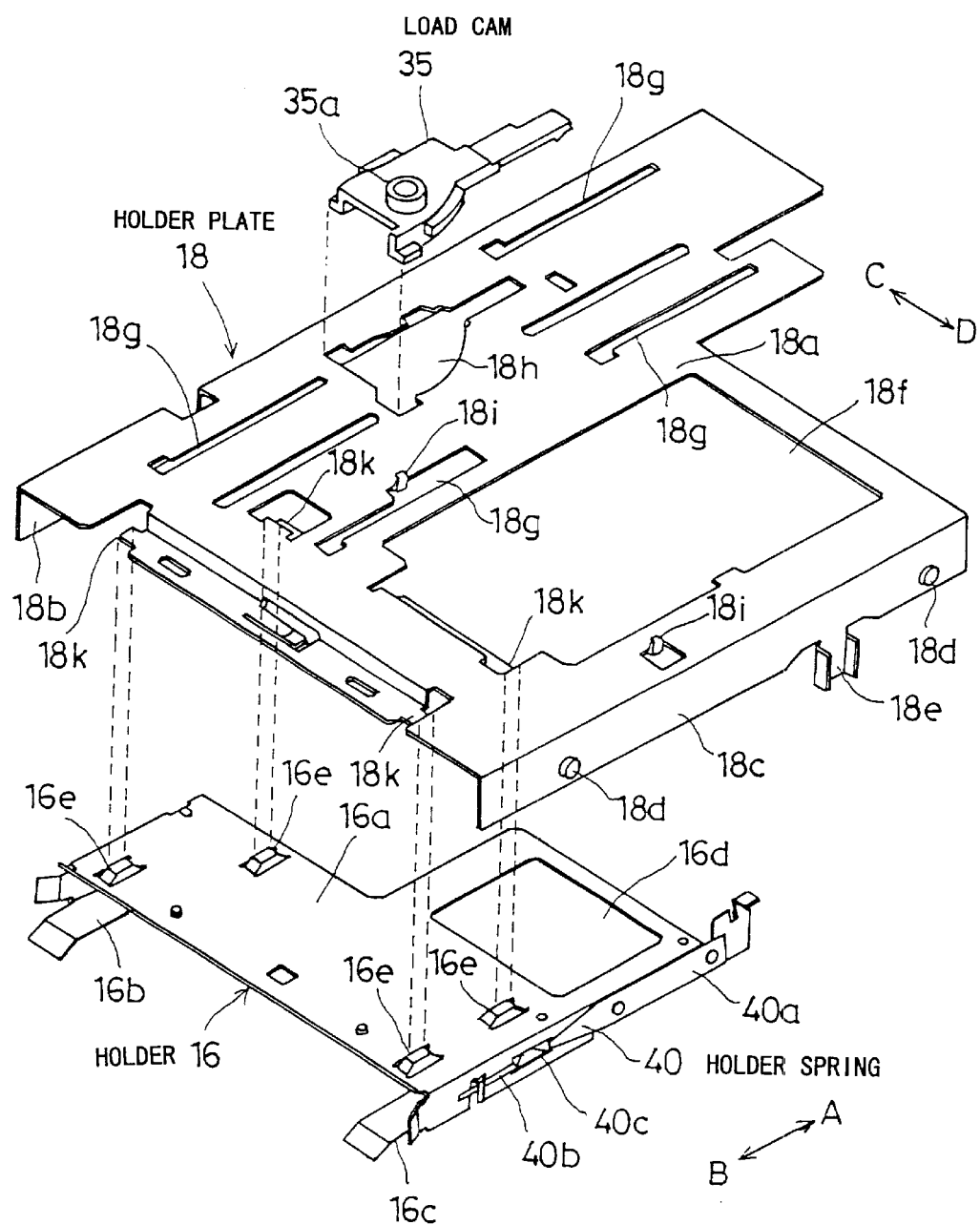
FIG. 5 is a diagram showing an exploded oblique view of a holder and a holder frame.

FIG. 5 is a diagram showing an exploded oblique view of a holder 16 and a holder frame 18. As shown in FIG. 5, the holder 16 into which the disk cartridge C is inserted and the holder frame 18 that supports the holder 16 are assembled as a single unit.

The holder 16 comprises a cover 16a and cartridge guides 16b, 16c extending from both sides of the cover 16a and bent so as to enclose the disk cartridge C, the space thus enclosed by the cover 16a and cartridge guides 16b, 16c forming a cartridge insertion portion.

An opening 16d is provided on the cover 16a for the purpose of permitting the magnetic head unit 36 to pass therethrough, while retaining parts 16e retained by retaining hooks 18k of the holder frame 18 are provided at four locations on the cover 16a. It should be noted that the opening 16d has the same shape and dimensions as a window opened and closed by the shutter 84 of the disk cartridge C.

Further, a holder spring 40 composed of a leaf spring is provided on a right side surface of the holder 16. A rear end 40a of the holder spring 40 is fixedly mounted on the right side surface of the holder 16 while a front end 40b of the holder spring 40 has a substantially triangular projection 40c projecting into the interior of the holder 16. As will be described later, the projection 40c is held at a position at which the shutter 84 of the disk cartridge C is opened and at the same time functions to close the shutter 84 relative to the disk cartridge C by engaging the shutter 84 so that the movement of the disk cartridge C closes the shutter 84.

Additionally, it should be noted that the holder 16 has a width between the cartridge guides 16b, 16c that is substantially the same as a width of the disk cartridge C.

The holder frame 18 comprises a cover 18a that covers the top of the holder 16, a left side surface 18b bent downward at a left side of the cover 18a and a right side surface 18c bent downward at a right side of the cover 18a. The holder frame 18 has a width between the left side surface 18b and the right side surface 18c that is substantially the same as a width of the slider 20.

Engaging pins 18d that engage slanted slots in the slider 20 and engaging members 18e that engage concavities 28b in the chassis 28 and limit a back and forth movement thereof are provided on the left side surface 18b and the right side surface 18c. The engaging pins 18d are integrally formed as a single unit with the holder frame 18 and can be manufactured easily because the extent of the projection required is smaller than that required were the engaging pins to be provided instead on the holder 16, which has a smaller width than that of the holder frame 18.

Additionally, opening 18f for the purpose of permitting the magnetic head unit 36 to pass therethrough and guide slots 18g for guiding a sliding movement of the slide holder 25 are provided on the cover 18a of the holder frame 18. In addition, a mounting member 18h mounting a load cam 35 and an engaging member 18i engaging one end of a coil spring 44 provided between the engaging member 18i and the slider 20 are also provided on the cover 18a of the holder frame 18.

The slider 20 comprises a cover 20a that covers the holder frame 18, a left side surface bent downward from a left side of the cover 20a and a right side surface bent downward from a right side of the cover 20a, and is mounted on the chassis 28 so as to be freely movable in a direction indicated by arrows A, B in the drawing. In addition, the cover 20a is provided with an opening 20d for the purpose of permitting the magnetic head unit 36 to pass therethrough, an elongated round hole 20e into which is inserted a cylindrical portion 35a of the load cam 35, a supporting tab 20f that slidably supports the head load plate 22, a stopper 20g that restricts a slide position of the head load plate 22 in a forward direction, an engaging member 20h that engages the other end of the coil spring 42 that urges the head load plate 22, and engaging member 20i engaging the other end of the coil spring 44.

It should be noted that the other end of the coil spring 42 is engaged by engaging member 18i projecting from the cover 18a of the holder frame 18, so the coil spring 44 urges the slider 20 in the direction of arrow B.

Further provided on the left side surface 20b of the slider 20 and the right side surface 20c of the slider 20 are slanted slots 20j, into which the engaging pins 18d of the holder frame 18 are inserted so as to raise and lower the holder frame 18, and projecting pins 20k, which engage engaging slots 46a of fixedly mounted members 46 projecting from the frame 26 so as to restrict an up-and-down movement thereof.

It should be noted that projecting pins 20k are retentively engaged by engaging slots 46a of fixedly mounted members 46 when for example the slider 20 is in a position prior to insertion of a disk cartridge C, and maintain an anti-floating state. As a result, even relatively large shocks occurring during shipping and handling do not produce elastic deformations of the rubber insulator 27 and damage due to increases in the force of impact can be prevented.

Additionally, the head load plate 22 is supported so as to be slidable in a back-and-forth direction by the supporting tab 20f provided on the cover 20a of the slider 20. Moreover, the head load plate 22 is provided with a cam member 22a that moves the magnetic head 53 of the magnetic head unit 36 in stages attendant upon a sliding movement, an engaging member 22b that engages the other end of the coil spring 42, a sliding slot 22c into which the supporting tab 20f can slide, and a supporting member 22d that supports the magnetic head 53 of the magnetic head unit 36 in its raised position.

The coil spring 42 urges the head load plate 22 in the direction of arrow A. An engaging pin 20m that engages an elongated hole 22e extending in the A, B direction along the head load plate 22 projects from the cover 20a, both guiding the direction in which the head load plate 22 slides as well as restricting a sliding position thereof.

Figure 6:
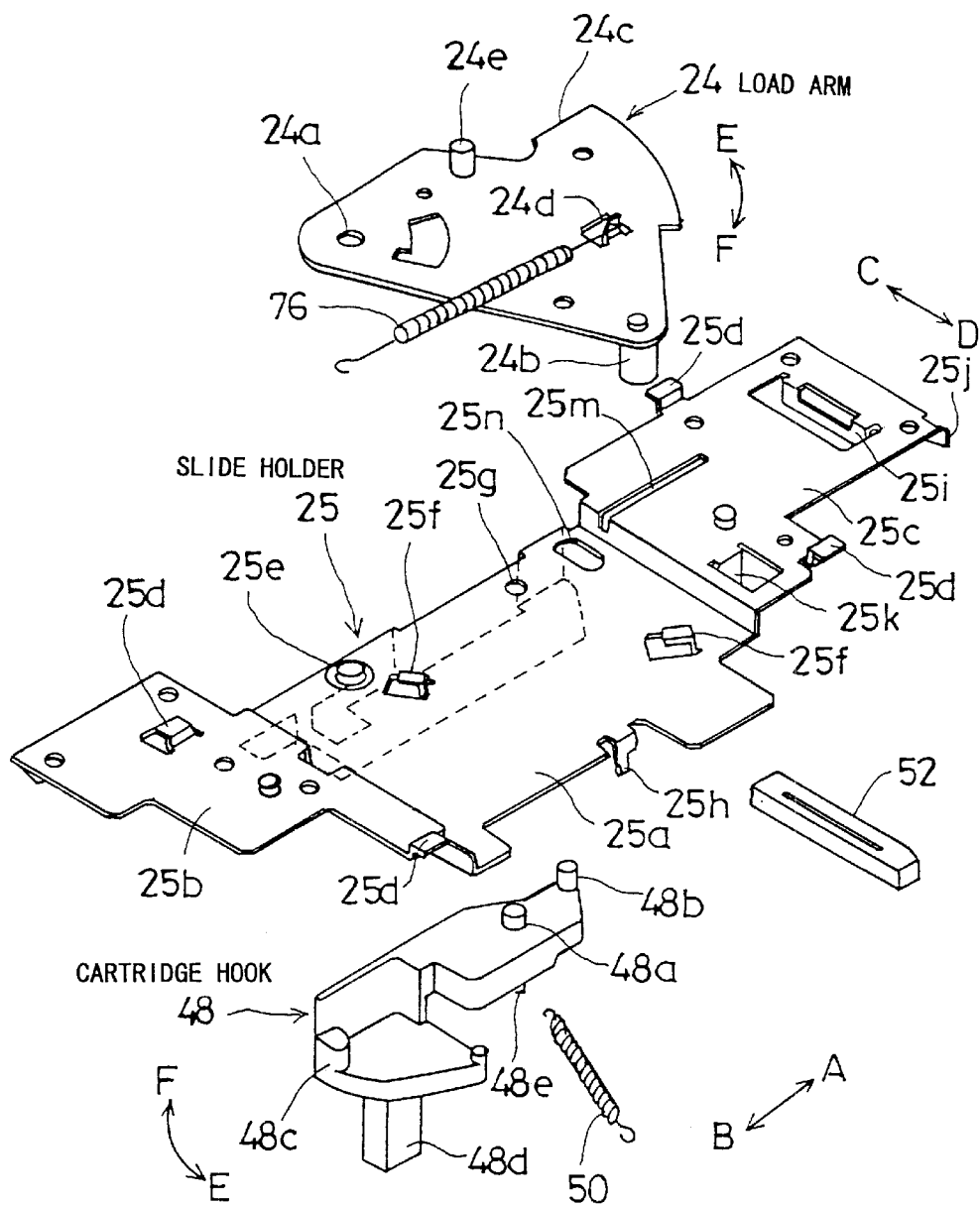
FIG. 6 is a diagram showing an exploded oblique view of a load arm and a slide holder.

FIG. 6 is a diagram showing an exploded oblique view of the load arm 24 and slide holder 25. As shown in FIG. 6, the slide holder 25 has a recessed portion 25a that rotatably supports the load arm 24 and sliding contact members 25b, 25c extending in the A, B direction from both sides of the recessed portion 25a and that slidingly contact the holder frame 18. Engaging tabs 25d engaging the guide slots 18g of the holder frame 18 project from the sliding contact parts 25b, 25c. The engagement of the engaging tabs 25d with the guide slots 18g both guides the sliding movement of the slide holder 25 in the A, B direction and prevents the holder frame 18 from dislocating. Additionally, a slot 25m into which the load cam 35 is inserted is provided on the sliding contact member 25c. Additionally, a shaft member 25e that is inserted into a hole 24a of the load arm 24 and that rotatably supports the load arm 24 projects from the recessed portion 25a, as does a hook-shaped retaining tab 25f that limits a rotation position of the load arm 24.

The load arm 24 has a contact pin 24b projecting from a bottom surface thereof and contacting a front edge of the disk cartridge C, an edge member 24c that is contacted by a pin 48b of the cartridge hook 48, a spring retaining member 24d that projects from a top surface side of the load arm 24, and a contacting pin 24e that slidingly contacts a swing cam 35d to be described later provided inside the load cam 35. The load arm 24 is rotatably urged in a direction of arrow F by a spring force of a coil spring 76 engaged by the spring retaining member 24d. It should be noted that the movement of the contacting pin 24e is limited to the interior of the load cam 35 during insertion of the disk cartridge C so as not to interfere with retraction of the disk cartridge C, while rotating within the interior of the load cam 35 so as to push the disk cartridge C to a position forward of an insert position during ejection.

Additionally, when the disk cartridge C is inserted into the holder 16, the contacting pin 24b of the load arm 24 is pressed by the disk cartridge C and rotated in a direction of arrow E. Further, the spring force of the coil spring 76 rotates the load arm 24 in the direction of arrow F so that the contacting pin 24b presses the disk cartridge C in an eject direction, that is, the direction of arrow B.

Additionally, an aperture 25g for the purpose of rotatably supporting the cartridge hook 48 is provided on the recessed portion 25a.

The cartridge hook 48 itself comprises a shaft 48a that communicates with the aperture 25g, the contacting pin 48b that contacts an edge member 24c of the load arm 24, a projection 48c for engaging a concavity 82 formed in a side surface of the disk cartridge C to be described later with reference to FIG. 31, a switch pressing member 48d that turns ON and OFF a motor switch 80 to be described later with reference to a detecting means and FIG. 23, such switch starting and stopping a loading drive motor 62 to be described later, and a spring retaining member 48e to which one end of a coil spring 50 is engaged. The other end of the coil spring 50 is engaged by spring retaining member 25h of the slide holder 25.

The pin 48b of the cartridge hook 48 is inserted into an elongated hole 25n provided on the recessed portion 25a and contacts the edge member 24c of the load arm 24, so when the load arm 24 rotates in the direction of arrow E as the disk cartridge C is inserted the pin 48b also rotates in tandem with the load arm 24 in the same direction. The rotation in the direction of arrow E causes the projection 48c to engage the concavity 82 in the disk cartridge C, thus engaging the disk cartridge C.

Additionally, the sliding contact member 25c of the slide holder 25 is provided with a mounting member 25i, on which is mounted a guide plate 52, and a downwardly bent flange member 25j at one end of the sliding contact member 25c located at a predetermined distance from the mounting member 25i. An offset pin 38a of the cam gear 38 to be described later is inserted between the guide plate 52 and the flange member 25j, such that the rotation of the cam gear 38 is transmitted to the slide holder 25.

A description will now be given of the structure of the lower unit 14.

Figure 7:
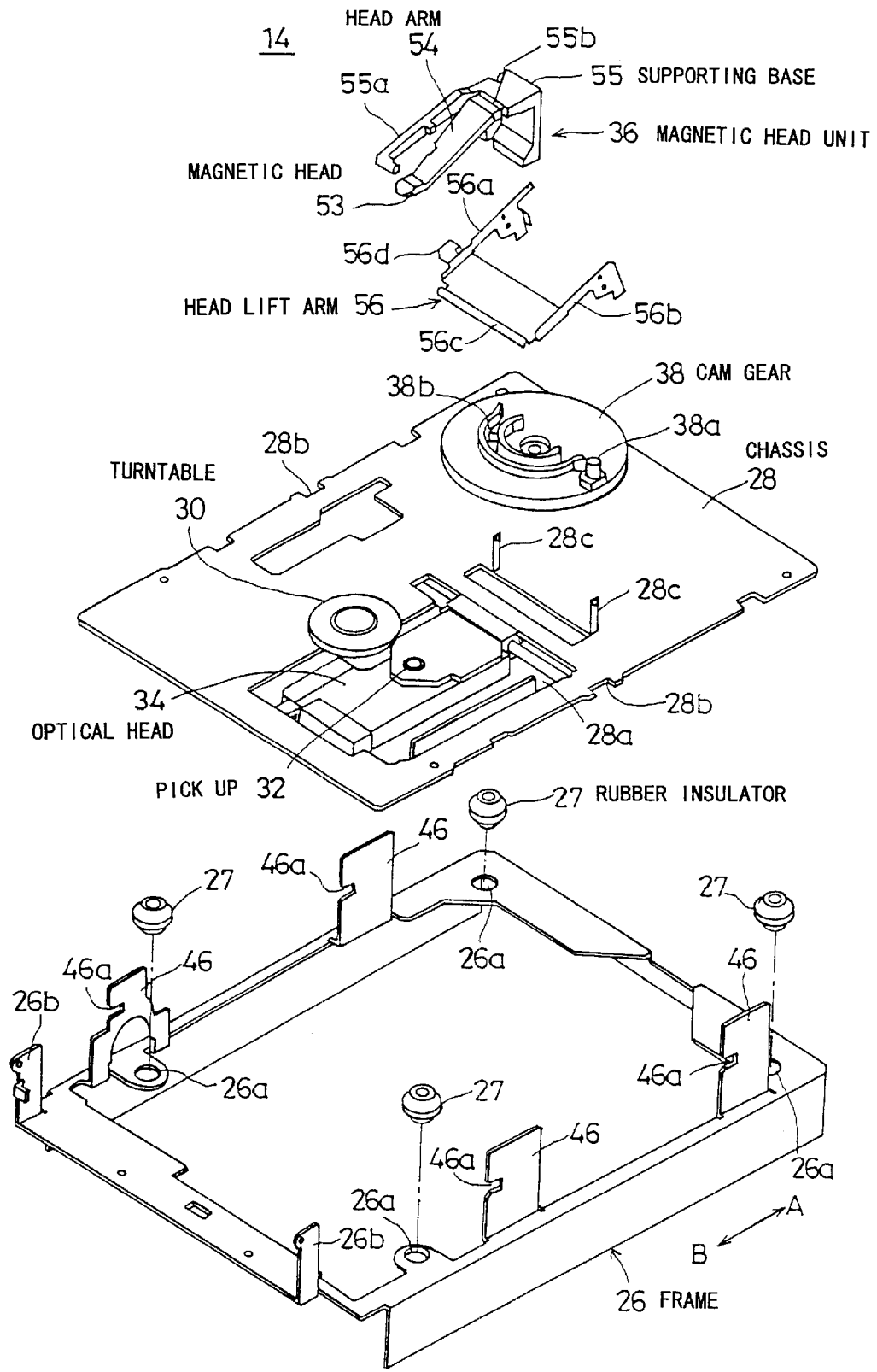
FIG. 7 is a diagram showing an exploded oblique view for the purpose of explaining the structure of the lower unit.

FIG. 7 is a diagram showing an exploded oblique view for the purpose of explaining the structure of the lower unit 14. As shown in FIG. 7, the frame 26 forms substantially a rectangular frame in shape and includes four fixedly mounted members 46 that engage the slider 20 during ejection of a disk cartridge C, four round holes 26a for engaging four rubber insulators 27, and a pair of flap supporting members 26b provided on a front edge of the frame 26 and projecting upward therefrom.

The chassis 28 is mounted in a state of flotation on the frame 26 via the rubber insulators 27, so external vibrations are not transmitted to the chassis. It should be noted that engaging slots 46a of fixedly mounted members 46 engage the slider 20 when the slider 20 is in a position prior to insertion of a cartridge so as to prevent amplification by the rubber insulators 27 of vibrations during shipping and handling and at the same time to set the position of the holder 16 with respect to the frame 26 prior to insertion of a cartridge so as to improve the ease with which the disk cartridge C is inserted.

An opening 28a for the purpose of disposing the optical head 34 and the magnetic head unit 36 opposite each other beside the turntable 30 that rotatably drives the disk-like recording medium is provided in the chassis 28. That is, the optical head 34 is positioned beneath the opening 28a and the magnetic head unit 36 is positioned above the opening 28a.

The magnetic head unit 36 is provided so as to be disposed opposite to and above the optical head 34. The magnetic head unit 36 comprises a head arm 54 that supports the magnetic head 53, a carriage 55 that rotatably supports the head arm 54 so that the head arm can swing up and down, and a head lift arm 56 that raises and lowers the head arm 54.

The head lift arm 56 comprises arm members 56a, 56b rotatably supported by a pair of supporting members 28c projecting from the chassis 28 so as to be able to swing up and down, a bridge member 56c disposed between the arm members 56a, 56b and contacting a bottom surface of the head arm 54, and an engaging member 56d projecting from a side on which the arm member 56a is provided.

The carriage 55 has a leaf spring 55b that supports the head arm 54 and a top arm 55a that extends horizontally. Additionally, the head lift arm 56 is urged upward by a coil spring 57 to be described later so that the engaging member 56d slidingly contacts the cam member 22a of the head load plate 22, thus causing the head arm 54 to rise and fall in response to the shape of the cam member 22a as the head load plate 22 slides.

Prior to the insertion of a cartridge, the head arm 54 contacts the bridge member 56c of the head lift arm 56 and is lifted upward, so that together with the loading of a cartridge the head lift arm 56 is lowered by the cam member 22a of the head load plate 22, thus bringing the magnetic head 53 into close proximity to the disk-like recording medium.

Additionally, the cam gear 38 has the offset pin 38a described above that either engages between the guide plate 52 of the slide holder 25 and the flange member 25j, contacts an edge member 20q of the slider 20 or contacts an edge member 22f of the head load plate 22. Additionally, the cam gear 38 has a cam groove 38b that engages either a slider 20 cam engaging tab to be described later or a slide holder 25 cam engaging tab to be described later. As a result, when the cam gear 38 is rotated by the drive motor to be described later, movement in the A, B direction of the slider 20 and slide holder 25 that engage the cam groove 38b and the slide holder 25 can be restricted and at the same time the slide holder 25, slider 20 and head load plate 22 engaged by the offset pin 38a can be moved in the A, B direction.

Figure 8:
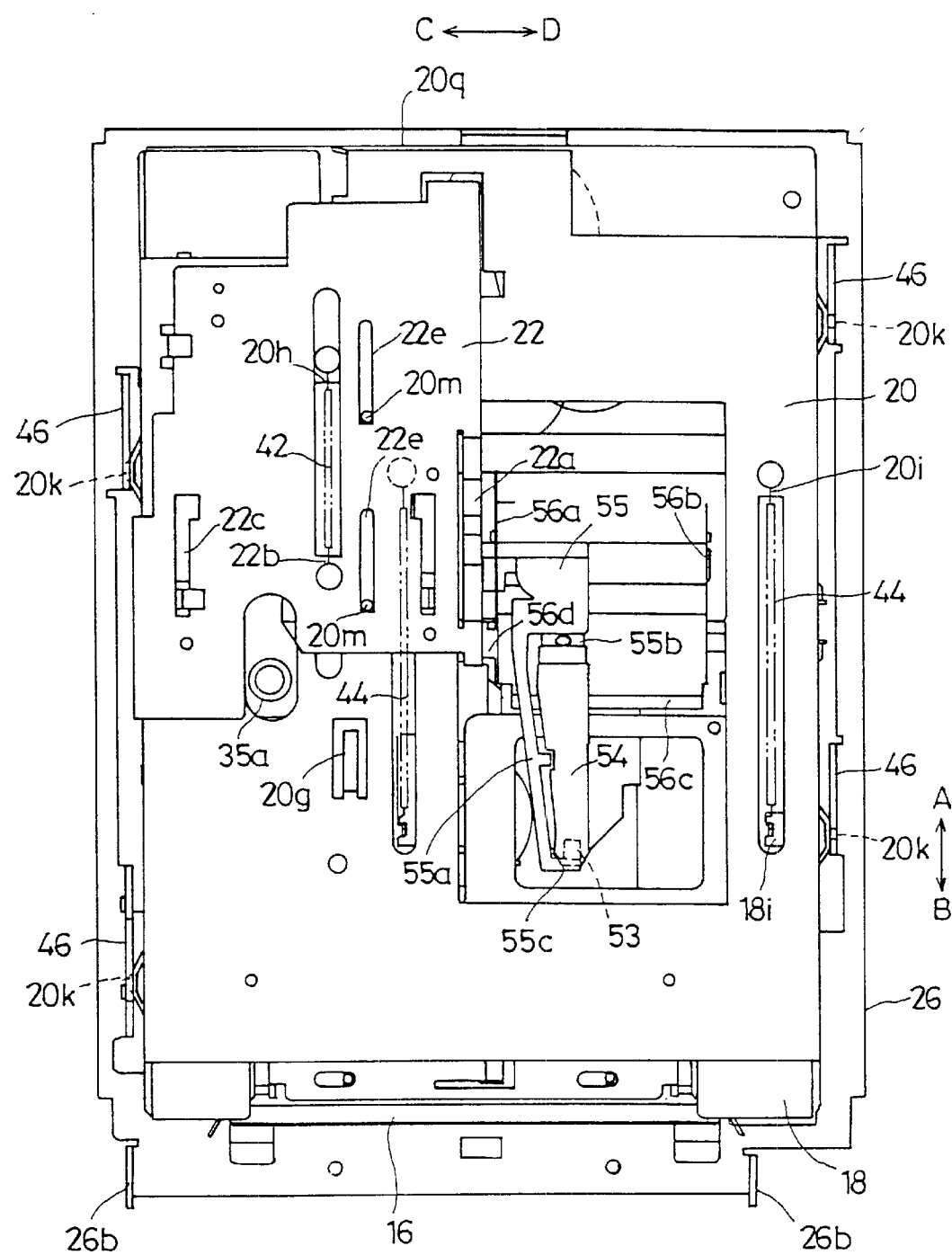
FIG. 8 is a diagram showing a plan view of a state before insertion and after ejection of a cartridge.

FIG. 8 is a diagram showing a plan view of a state before insertion and after ejection of a cartridge. As shown in FIG. 8, in the above-described state the slider 20 is urged in the direction of arrow B by the force of the coil spring 44 but is urged in the direction of arrow A by the cam gear 38. Additionally, in the above-described state the head load plate 22 is moved in the direction of arrow A by the force of the coil spring 42 and moves in the direction of Arrow B in tandem with the insertion of a cartridge in a process to be explained later.

In the above-described state, that is, a state before insertion and after ejection of a cartridge, the head arm 54 contacts the bridge member 56c of the head lift arm 56 and is lifted upward. Additionally, a forward edge of the head arm 54 contacts a bottom surface of a front edge 55c of a top arm 55a extending horizontally from the carriage 55, thus limiting the extent to which the head arm 54 can rise.

Figure 9:
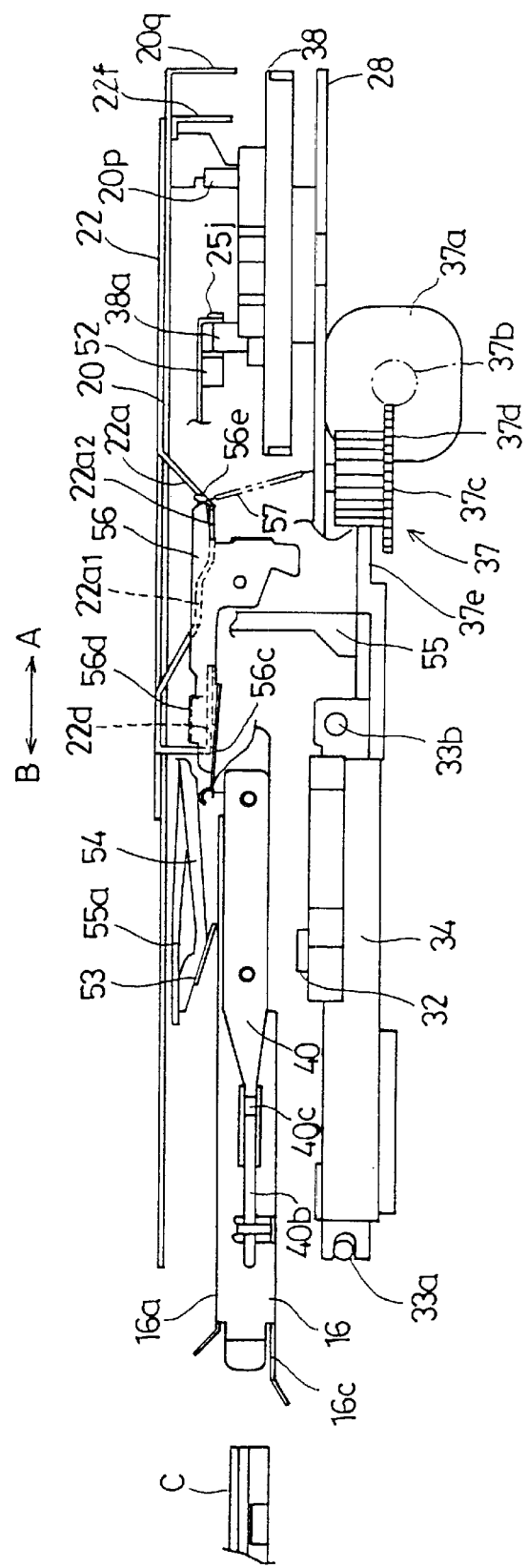
FIG. 9 is a diagram showing a side view of a state before insertion and after ejection of a cartridge.

FIG. 9 is a diagram showing a side view of a state before insertion and after ejection of a cartridge. As shown in FIG. 9, in the above-described state the holder 16 is raised to an insert/eject position. A front edge of the head lift arm 56 is rotated upward by the force of the coil spring 57 retained by a spring retaining member 56e on a rear edge of the head lift arm 56. The engaging member 56d of the head lift arm 56 is positioned on a bottom surface side of the cam member 22a of the head load plate 22, so that when the head load plate 22 slides in the direction of arrow B the head lift arm 56 rises in accordance with the stepped shape of the cam member 22a.

The cam member 22a comprises a first stepped portion 22a1 and a second stepped portion 22a2, the first stepped portion 22a1 and the second stepped portion 22a2 having different projecting heights, the first stepped portion 22a1 being formed at a height position greater than that of the second stepped portion 22a2. The difference in projecting heights is due to the fact that, as will be explained later, in the magneto-optic recording system, information recorded on a disk-like recording medium D can be reproduced by means of the optical head 34 alone, so that there is no need to put the magnetic head 53 into slidingly contact with the disk-like recording medium D. In other words, during reproduction of recorded information the engaging member 56d of the head lift arm 56 slidingly contacts the first stepped portion 22a1, while during recording of information the head load plate 22 moves in the direction of arrow B and the engaging member 56d slidingly contacts the second stepped portion 22a2.

Accordingly, the magnetic head 53 is held at a position separated from the disk-like recording medium D during reproduction of information from the disk-like recording medium and put into sliding contact with the disk-like recording medium D during recording of information to the disk-like recording medium D.

Additionally, when the slider 20 is in a position before insertion and after ejection of a cartridge, the downward swing of the engaging member 56d of the head lift arm 56 is limited by the supporting member 22d of the head load plate 22. As a result, the head arm 54 supports the magnetic head 53 in a retracted position above the holder 16. Accordingly, damage to the magnetic head due to the force of impact and vibrations occurring during shipping and handling is prevented because the head arm 54 is engaged by the supporting member 22d of the head load plate 22 via the head lift arm 56.

Additionally, the optical head 34 is guided by a pair of guide shafts 33a, 33b extending in a direction of arrows C, D so as to be movable in a radial direction of the disk-like recording medium D. Further, a head drive mechanism 37 that drives the optical head 34 in the direction of arrows C, D is mounted on the bottom surface of the chassis 28. The head drive mechanism 37 comprises a thread motor 37a for seek use, a worm gear 37b provided on a rotary shaft of the thread motor 37a, a large-diameter gear 37c that meshes with the worm gear 37b, a small-diameter gear 37d integrally formed with the large-diameter gear 37c as a single unit, and a rack 37e fixedly mounted on a rear surface of the optical head 34 and that meshes with small-diameter gear 37d.

Figure 10:
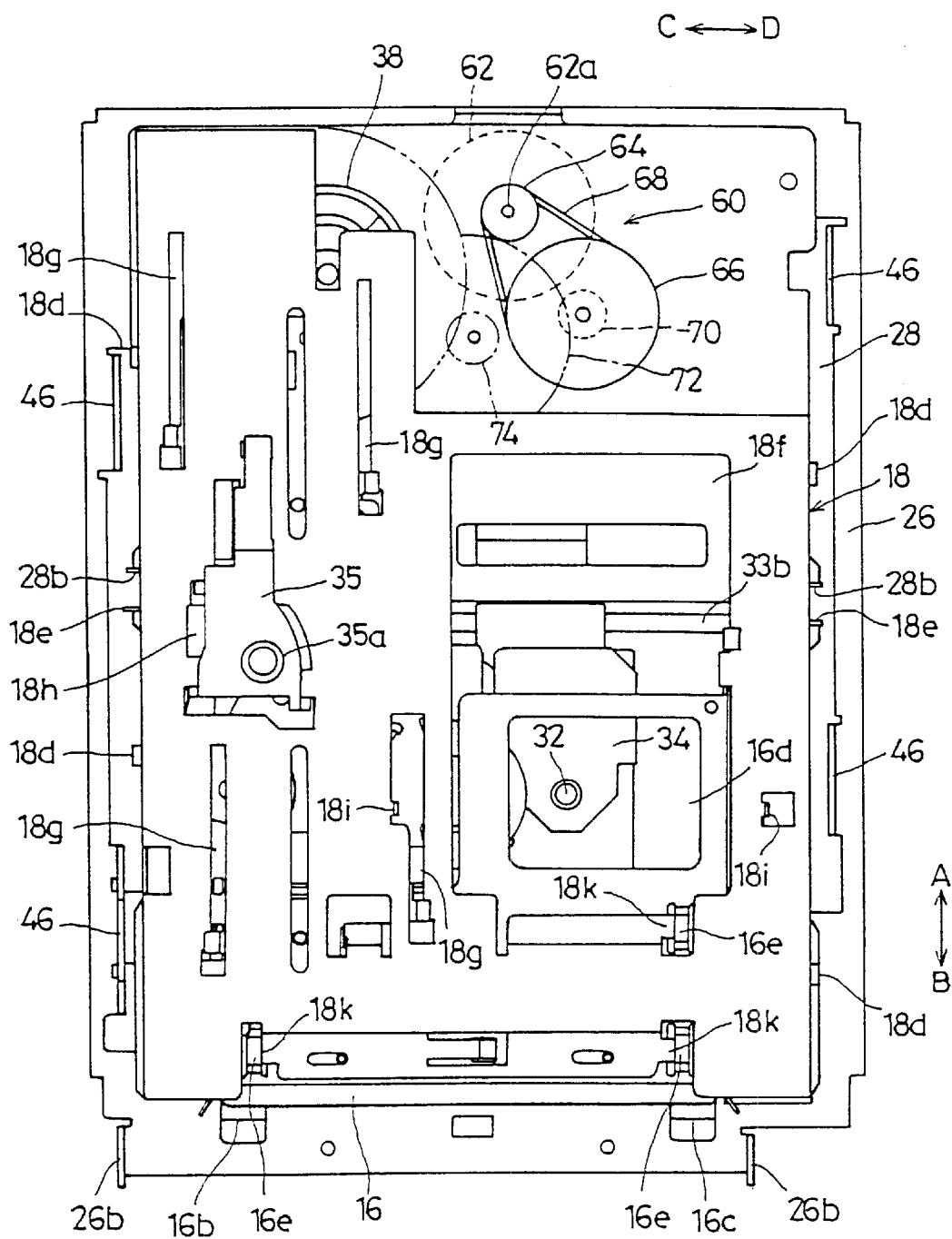
FIG. 10 is a diagram showing a plan view of a state before insertion and after ejection of a cartridge with the slider removed.

FIG. 10 is a diagram showing a plan view of a state before insertion and after ejection of a cartridge with the slider 20 removed.

As shown in FIG. 10 and as described above, the holder frame 18 positioned below the slider 20 has on both sides thereof engaging members 18e that engage concavities 28b in the chassis 28, as a result of which the holder frame 18, when viewed from above, appears to be permitted to move only in a vertical direction with respect to the slider 20, with longitudinal movement back and forth (in the direction of arrows A, B) and lateral movement left and right (in the direction of arrows C, D) restricted.

Figure 11:
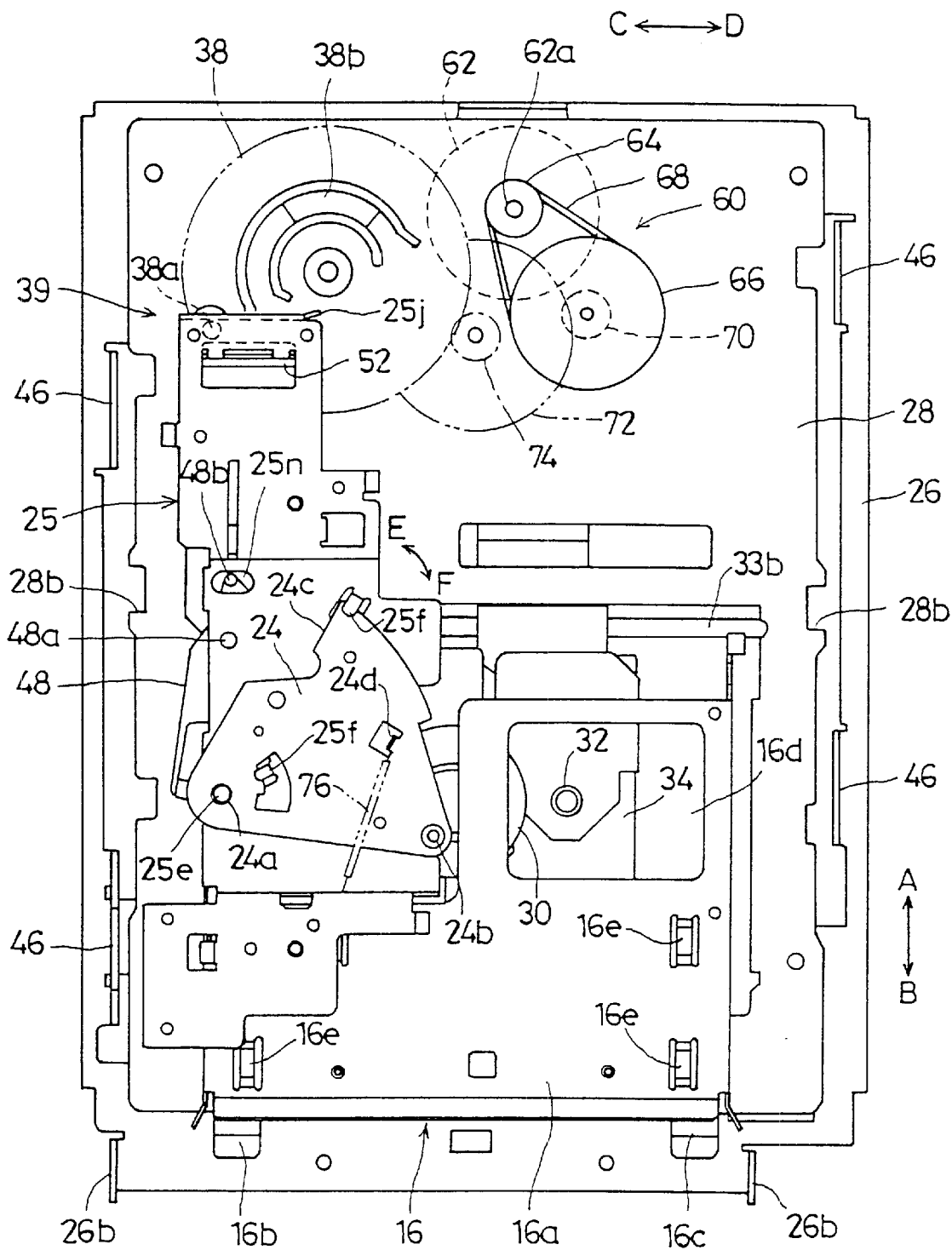
FIG. 11 is a diagram showing a plan view of a state before insertion and after ejection of a cartridge with the holder frame and the load cam removed.

FIG. 11 is a diagram showing a plan view of a state before insertion and after ejection of a cartridge with the holder frame 18 and the load cam 35 removed. As shown in FIG. 10, a drive member 60 that drives the cam gear 38 of the cartridge retraction mechanism 39 is provided at a side of the chassis 28 in the direction of arrow A. The drive member 60 comprises the drive motor (driving means) 62 mentioned previously, a first pulley 64 engaged by a drive shaft 62a, a second pulley 66, a belt 68 wound between the first and second pulleys 64, 66, a large-diameter gear 72 that meshes with another gear 70 integrally formed as a single unit with the pulley 64, and a small-diameter gear 74 integrally formed as a single unit with the large-diameter gear 72.

Additionally, the load arm 24 is rotatably urged in the direction of arrow F by the force of the coil spring 76 engaged by the spring retaining member 24d, such that during ejection the force of the coil spring 76 urges the load arm 24 in the direction of arrow F and the pin 24b ejects the disk cartridge C.

Figure 12:
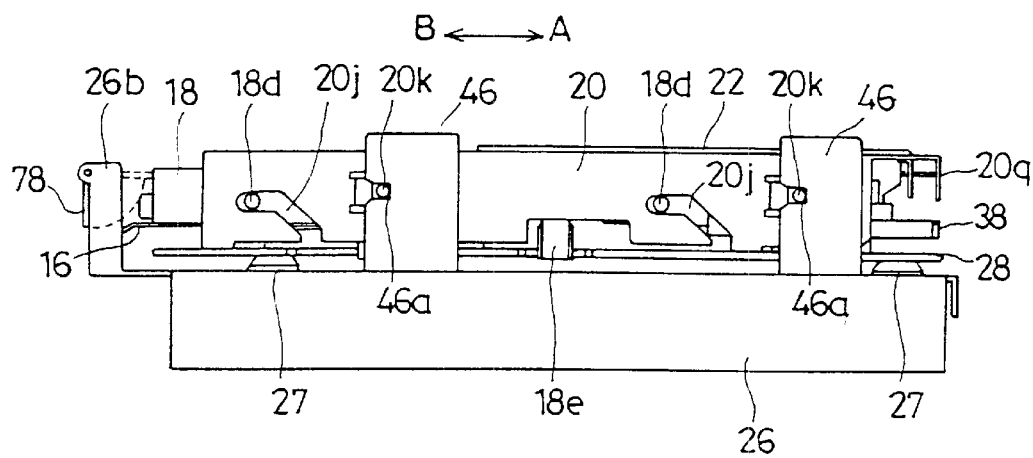
FIG. 12 is a diagram showing a side view of a state before insertion and after ejection of a cartridge.

FIG. 12 is a diagram showing a side view of a state before insertion and after ejection of a cartridge. As shown in FIG. 12, in such a state the slider 20 is moved in the direction of arrow A, so the holder frame 18 is maintained in a raised position opposite a flap 78. The flap 78 is rotatably supported by the flap supporting members 26b of the frame 26 so as to be able to rotate toward an interior of the disk drive and closes an opening for cartridge guide members 16b, 16c in the holder 16 that is integrally mounted so as to form a single unit with the holder frame 18.

Accordingly, when the disk cartridge C presses the flap 78 the flap 78 rotates inward so as to permit the insertion of the disk cartridge C. Additionally, the projecting pins 20k previously mentioned, which project from both sides of the slider 20, are, as previously mentioned, engaged by engaging slots 46a of fixedly mounted members 46 projecting from the frame 26. In so doing an anti-floating state is maintained, so that even if large vibrations are imparted to the rubber insulators 27 during shipping and handling such vibrations are prevented from being amplified by the elastic deformation of the rubber insulators 27. Additionally, prior to insertion of the disk cartridge C the holder 16 is stationed at a predetermined position with respect to the frame 26, thereby easing the insertion of the disk cartridge C.

Figure 13:
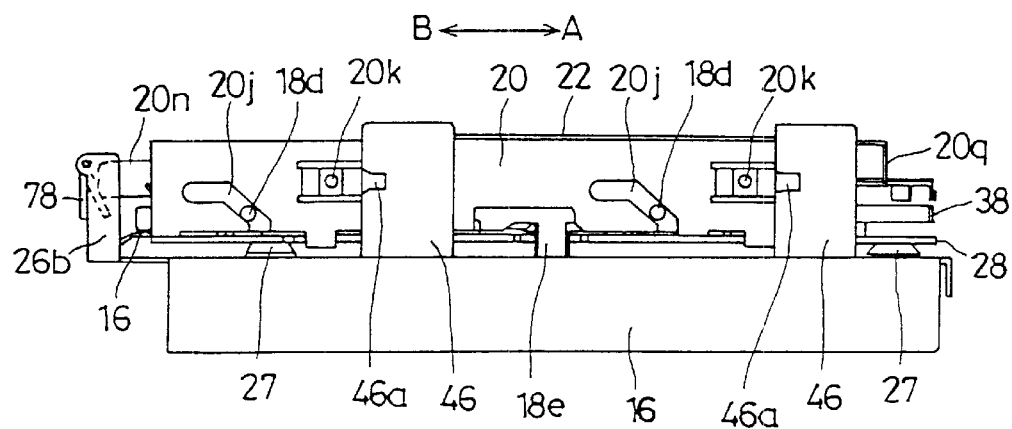
FIG. 13 is a diagram showing a side view of a cartridge loading state.

FIG. 13 is a diagram showing a side view of a cartridge loading state. As shown in FIG. 13, when the disk cartridge C is inserted into the cartridge guides 16b, 16c of the holder 16, the drive motor 62 is activated and a driving force of the drive motor 62 rotates the cam gear 38 in a clockwise direction, causing the slider 20 to move in the direction of arrow B. As a result, the engaging pins 18d of the holder frame 18 are engaged by and descend along the slanted slots 20j of the slider 20, thus lowering the holder 16 to a loading position.

At the same time, the projecting pins 20k of the slider 20 separate from the engaging slots 46a of the fixedly mounted members 46 and release a restriction on the rubber insulators 27, thus switching to and initiating a floating state. Additionally, a stopper 20n projecting in the direction of arrow B from the left side surface of the slider 20 contacts an interior surface of the flap 78. As a result, in a state in which a disk cartridge C is already loaded and an operator attempts to load another disk cartridge C, the flap 78 contacts the stopper 20n and cannot open, thus preventing the second disk cartridge C from being loaded on top of the first.

Additionally, during ejection, when the slider 20 is moved in the direction of arrow A, the holder 16 and the frame 18 rise from the above-described load position to the cartridge insert/eject position.

A description will now be given of an operation of the head arm 54 attendant upon the above-described loading operation.

Figure 14A:
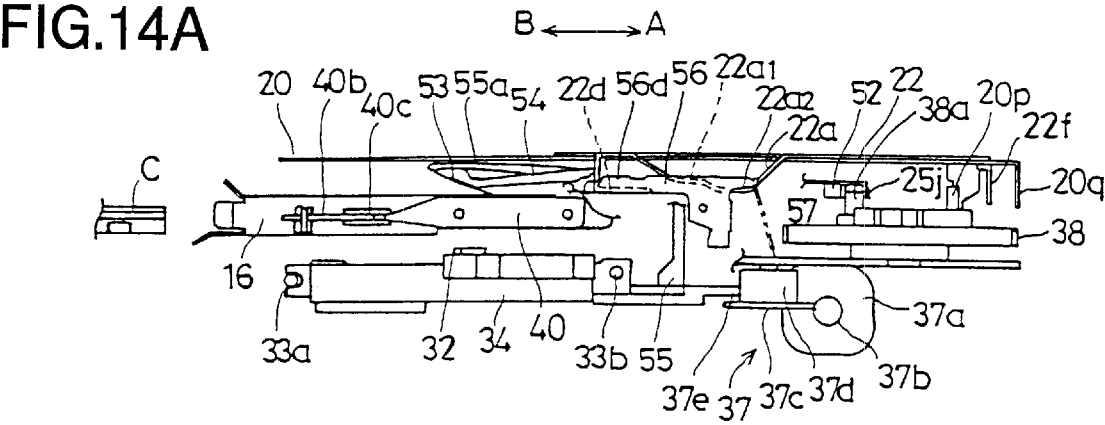
FIGS. 14A, 14B and 14C are diagrams showing side views of a state of a disk cartridge C before insertion, during recording and during reproduction, respectively.
Figure 14B:
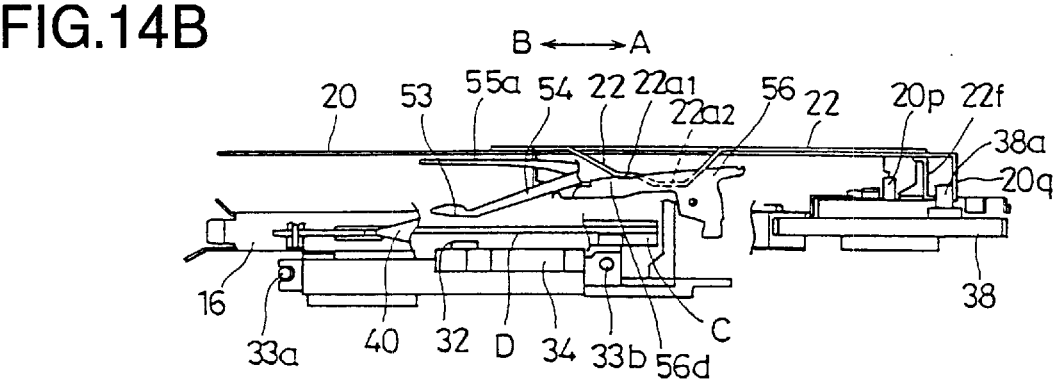
Figure 14C:
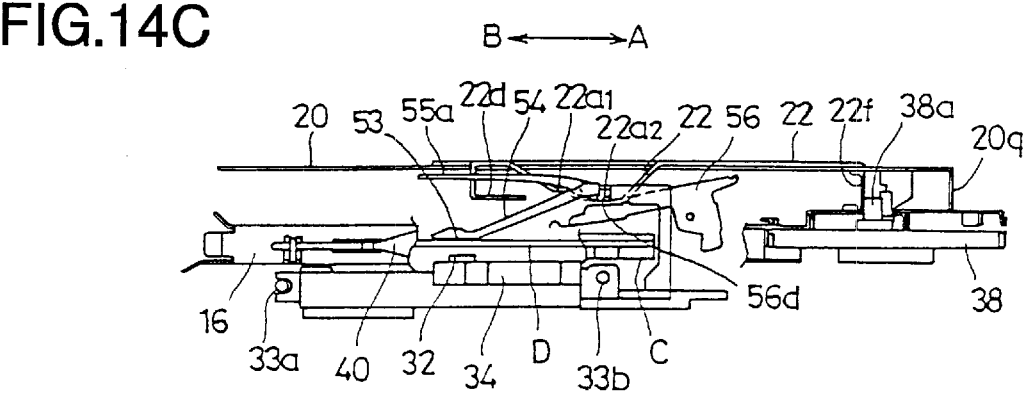

FIGS. 14A, 14B and 14C are diagrams showing side views of a state before insertion of, during recording to and during reproduction from a disk cartridge C, respectively. As shown in FIG. 14A, before the disk cartridge C is inserted the holder 16 is raised to an insert/eject. Additionally, as described previously the front edge of the head lift arm 56 is rotated upward by the force of the coil spring 57 retained by the spring retaining member 56e disposed on the rear edge of the head lift arm 56. At this time, the engaging member 56d of the head lift arm 56 is positioned between a bottom surface of the cam member 22a of the head load plate 22 and the supporting member 22d.

Additionally, the head arm 54 contacts the bridge member 56c of the head lift arm 56 and is lifted upward. The forward edge of the head arm 54 contacts the bottom surface of the front edge 55c of the top arm 55a extending horizontally from the carriage 55, thus limiting the extent to which the head arm 54 can rise.

As a result, as described previously the magnetic head 53 is retained in a retracted position above the holder 16. Moreover, the supporting member 22d of the head load plate 22 is positioned beneath the engaging member 56d of the head lift arm 56, thus limiting the downward rotation of the head lift arm 56. Accordingly, the downward movement of the forward edge of the head arm 54 is restricted, with the result that the magnetic head 53 is restricted to a position at or near the retracted position described above. Accordingly, external impacts do not cause the magnetic head 53 to move downward and collide with other members thereat, thus preventing damage to the magnetic head 53.

Additionally, as shown in FIG. 14B, when the cam gear 38 rotates clockwise and the slider 20 which engages the offset pin 38a moves in the direction of arrow B, the engaging pins 18d of the holder frame 18 descend along the slanted slots 20j of the slider 20. As a result, the holder 16 coupled to the holder frame 18 descends to a load position.

During reproduction of information from the disk-like recording medium, when the holder 16 into which the disk cartridge C is inserted descends to the load position and the head load plate 22 provided on the slider 20 moves in the direction of arrow B, the engaging members 56d of the head lift arm 56 slidingly contacting the cam member 22a of the head load plate 22 is pressed by the first stepped portion 22a1 of the cam member 22a and displaced to an unload position one step below.

At this time, the forward edge of the head arm 54 rotates downward together with the rotation of the head lift arm 56 and the magnetic head 53 slidingly contacts the disk-like recording medium D, thereby enabling magneto-optical recording of information to the disk-like recording medium D. It should be noted that, during recording, the head lift arm 56 descends to a position separated from the head arm 54.

In the eject state shown in FIG. 14A, the magnetic head 53 is maintained in a retracted position so as not to collide with the inserted disk cartridge C. At this time, the extend of the bending of the leaf spring 55b that supports the head arm 54 is at a maximum and so a frictional force between the head arm 54 and the head lift arm 56 is also large.

In the information reproduction state shown in FIG. 14B, the magnetic head 53 is slightly removed from the disk-like recording medium D, so there is no friction between the magnetic head 53 and the disk-like recording medium D. Accordingly, the disk rotational load is small compared to a state in which the magnetic head 53 is pressed by the disk-like recording medium D and consequently the amount of power consumed by the spindle motor (disk motor) is reduced.

Additionally, the extent of the bending of the leaf spring 55 that supports the head arm 54 is less than that when in an eject state as shown in FIG. 14A, so the force with which the head arm 54 presses against the head lift arm 56 is weaker than that when in an eject state. Accordingly, the frictional force between the head arm 54 and the head lift arm 56 is smaller, resulting in a smaller load during head seek.

In the information recording state shown in FIG. 14C, the magnetic head 53 slidingly contacts the disk-like recording medium D, thereby enabling information to be recorded to the disk-like recording medium D.

At this time, the head lift arm 56 is separated from the head arm 54, so the frictional force between the head lift arm 56 and the head arm 54 is zero. The magnetic head 53 is pressed against the disk-like recording medium D by the elastic force of the leaf spring 55 with an appropriate degree of force.

A description will now be given of the operation of the cam gear 38 of the cartridge retraction mechanism 39.

Figure 15:
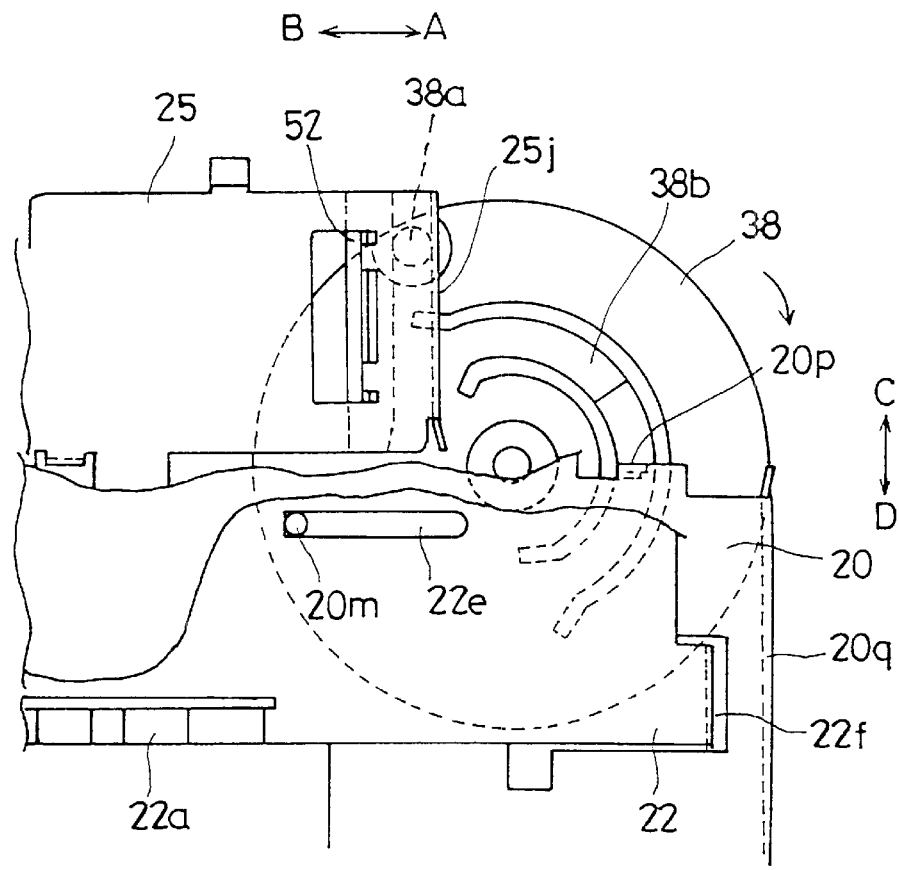
FIG. 15 is a diagram showing a plan view of an operating state of a cam gear before insertion and after ejection of a cartridge.
Figure 16:
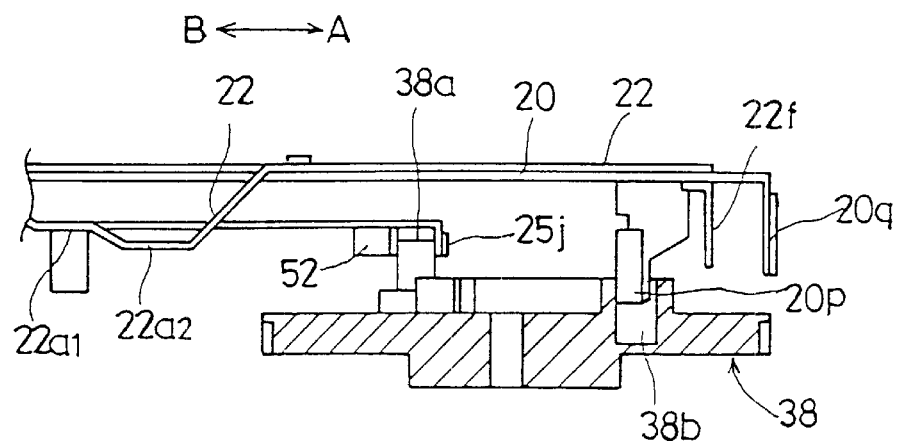
FIG. 16 is a diagram showing a cross-sectional view of an operating state of the cam gear before insertion and after ejection of a cartridge.

FIG. 15 is a diagram showing a plan view of an operating state of the cam gear 38 before insertion and after ejection of a cartridge. FIG. 16 is a diagram showing a cross-sectional view of an operating state of the cam gear 38 before insertion and after ejection of a cartridge.

As shown in FIGS. 15 and 16, in a state prior to insertion of a disk cartridge C and likewise in a state after ejection of a disk cartridge C, the offset pin 38a of the cam gear 38 is engaged between the guide plate 52 and the flange member 25j of the slide holder 25 and a cam engaging top 20p of the slider 20 engaging the cam groove 38b. As a result, the slider 20 is displaced in the direction of arrow B and the slide holder 25 is displaced in the direction of arrow B. It should be noted that the head load plate 22 is moved in the direction of arrow A by the force of the coil spring 42.

In such a state, when the disk cartridge C is inserted in the holder 16, the pin 24b of the load arm 24 is pressed and the load arm 24 rotates in the direction of arrow E. At the same time, the cartridge hook 48 rotates in the direction of arrow E and a motor switch 80 to be described later is switched from ON to OFF. As a result, the drive motor 62 is activated and a drive force is transmitted to the cam gear 38 via the drive member 60, so the cam gear rotates clockwise from the position shown in FIG. 15 until the offset pin 38a presses the flange member 25j in the direction of arrow A.

As a result, the disk cartridge C engaged by the cartridge hook 48 moves together with the slide holder 25 in the direction of arrow A and is retracted into the holder 16.

Figure 17:
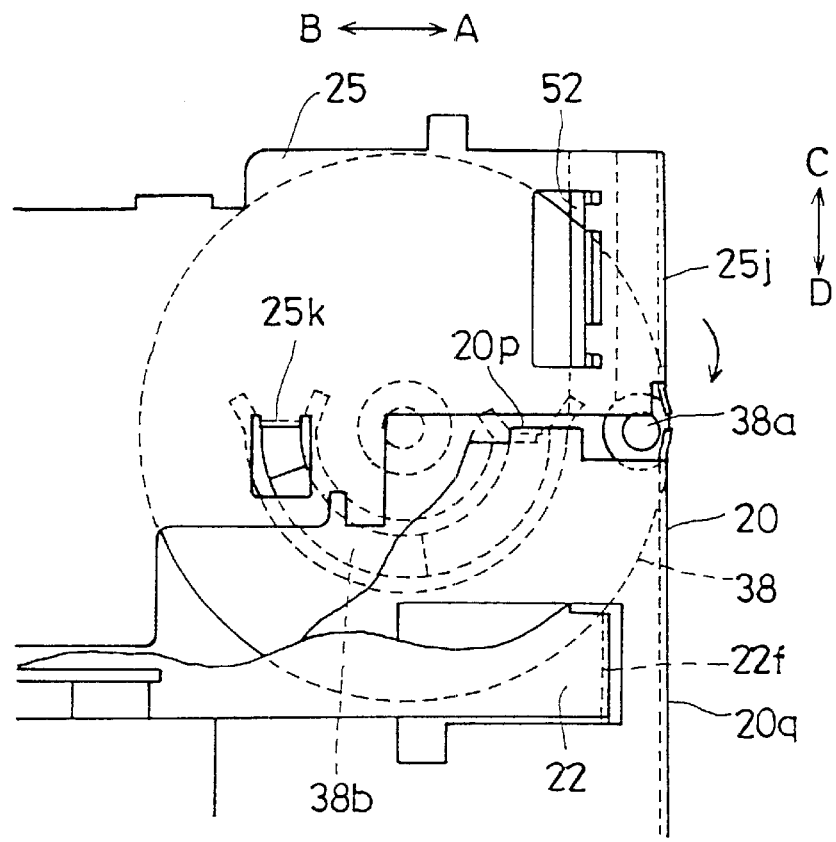
FIG. 17 is a diagram showing a plan view of an operating state of the cam gear at completion of cartridge retraction.
Figure 18:
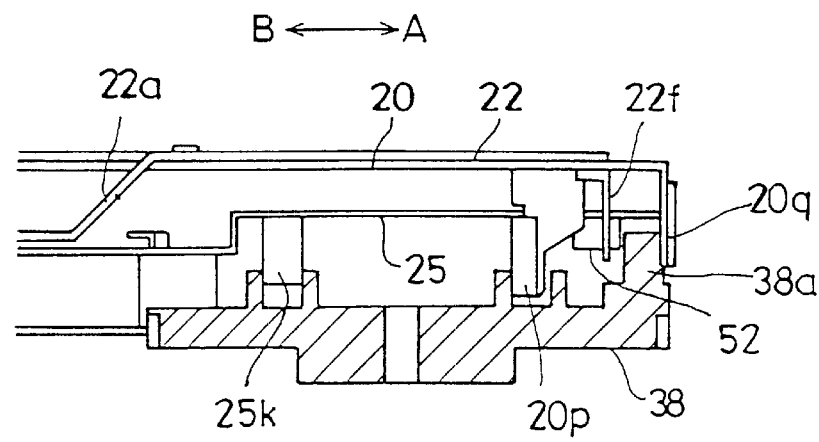
FIG. 18 is a diagram showing a cross-sectional view of an operating state of the cam gear at completion of cartridge retraction.

FIG. 17 is a diagram showing a plan view of an operating state of the cam gear 38 at completion of cartridge retraction. FIG. 18 is a diagram showing a cross-sectional view of an operating state of the cam gear 38 at completion of cartridge retraction.

As shown in FIGS. 17 and 18, when the offset pin 38a is rotated approximately 100° clockwise, the slide holder 25 reaches a cartridge retraction completion position. Further, as the offset pin 38a separates from between the guide plate 52 of the slide holder 25 and the flange 25j, an entry to the cam groove 38b aligns with an engaging member 25k of the slide holder 25 and the cam groove 38b engages the engaging member 25k. At the same time, an exit of the cam groove 38b reaches the cam engaging tab 20p of the slider 20.

Figure 19:
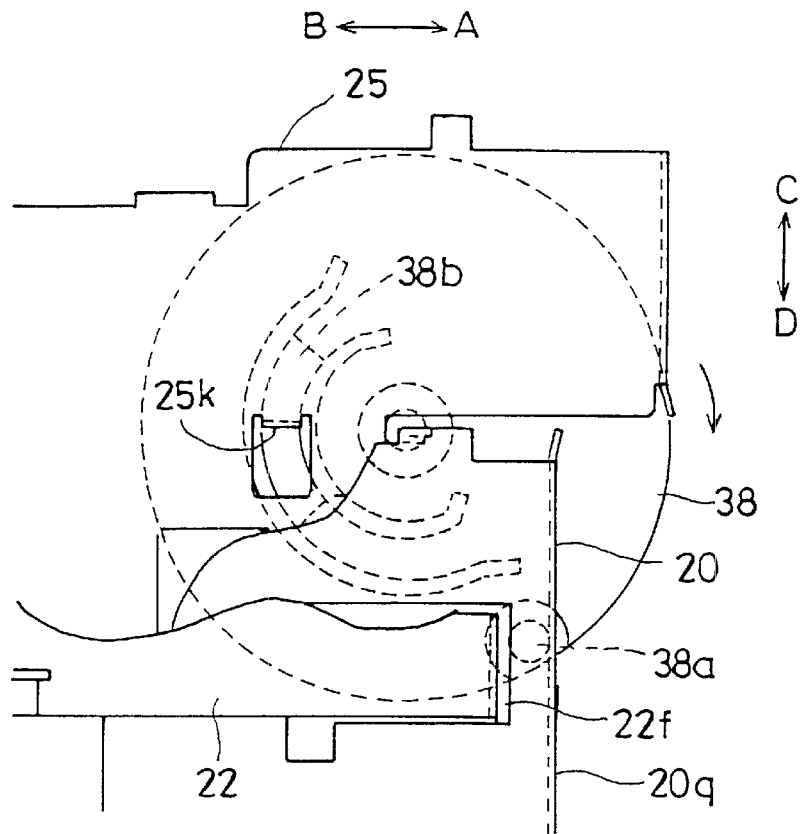
FIG. 19 is a diagram showing a plan view of a reproduction state of the cam gear.
Figure 20:
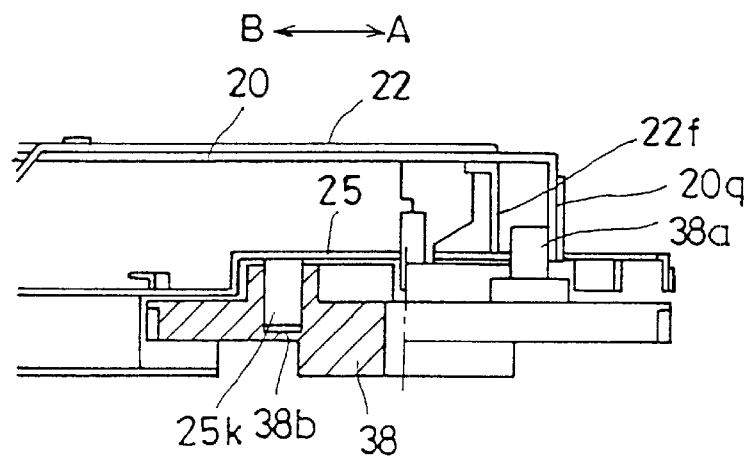
FIG. 20 is a diagram showing a cross-sectional view of a reproduction state of the cam gear.

FIG. 19 is a diagram showing a plan view of a reproduction state of the cam gear 38. FIG. 20 is a diagram showing a cross-sectional view of a reproduction state of the cam gear 38.

As shown in FIGS. 19 and 20, as the cam gear 38 rotates further in the clockwise direction, the cam groove 38b of the cam gear 38 separates from the cam engaging tab 20p of the slider 20 and is freed from restriction with respect to the slider 20. As a result, the force of the coil spring 44 causes the edge member 20q of the slider 20 to press the offset pin 38a in the direction of arrow B, and the cam gear 38 rotates and the offset pin 38a moves in the direction of arrow B, causing the slider 20 to follow in the same direction. At this time the engaging member 25k of the slide holder 25 engages the cam groove 38b, so the slide holder 25 maintains the disk cartridge C engaged by the cartridge hook 48 in the insert position.

Accordingly, as the slider 20 moves in the direction of arrow B the slider 20 moves from the cartridge insert/eject position shown in FIG. 12 to the cartridge load position shown in FIG. 13, as a result of which the engaging pins 18d of the holder frame 18 descend along the slanted slots 20j, causing the holder 16 and the holder frame 18 to lower the disk cartridge C to the load position. Accordingly, a lower surface of the disk-like recording medium D contained in the disk cartridge C is disposed opposite the optical head 34, enabling reproduction of information recorded on the disk-like a recording medium D.

Figure 21:
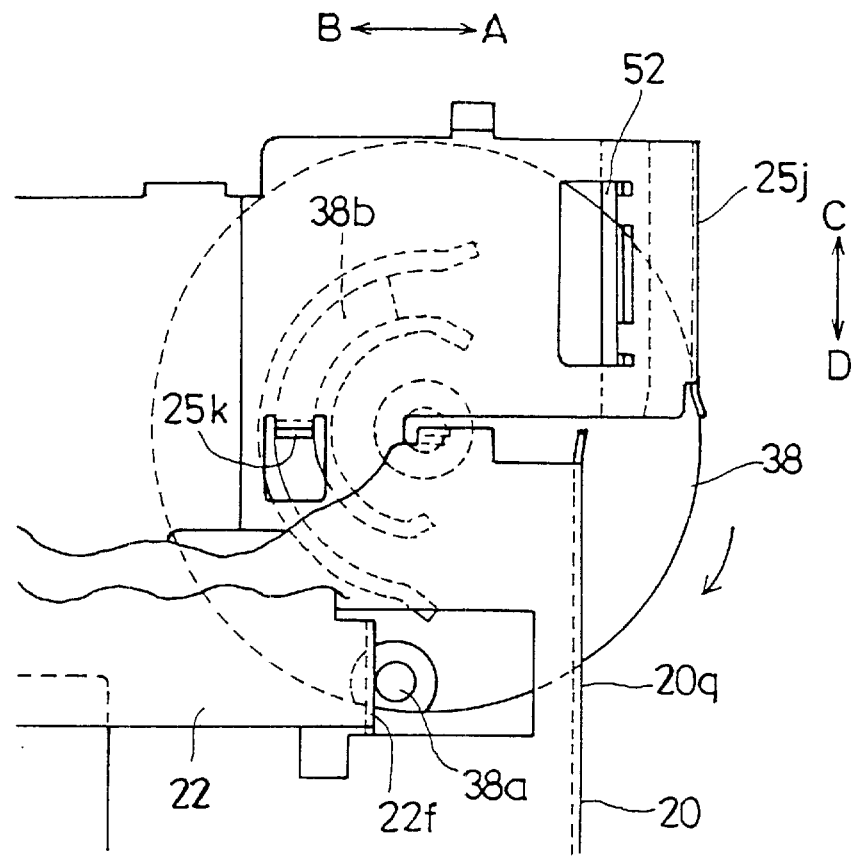
FIG. 21 is a diagram showing a plan view of a recording state of the cam gear.
Figure 22:
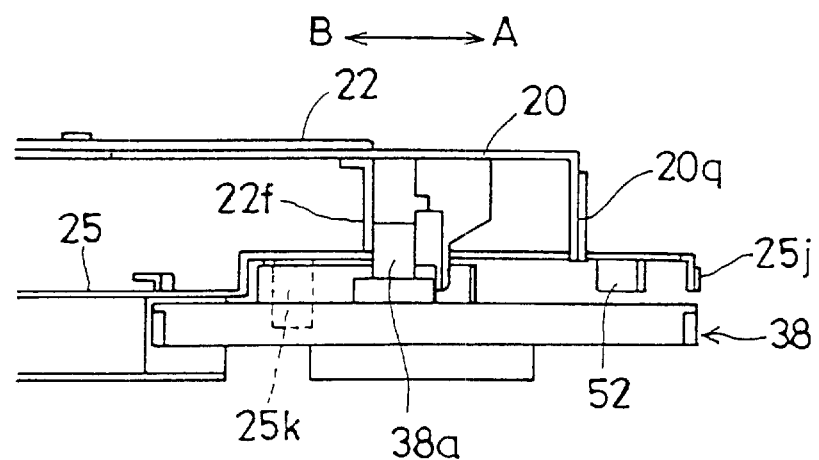
FIG. 22 is a diagram showing a cross-sectional view of a recording state of the cam gear.

FIG. 21 is a diagram showing a plan view of a recording state of the cam gear 38. FIG. 22 is a diagram showing a cross-sectional view of a recording state of the cam gear 38.

As shown in FIGS. 21 and 22, as the cam gear rotates further in the clockwise direction the offset pin 38a presses the edge member 22f of the head load plate 22 in the direction of arrow B, as a result of which the cam member 22a of the head load plate 22 slidingly contacts the engaging member 56d of the head lift arm 56, displacing the head lift arm 56 downward. Attendant upon this downward displacement of the head lift arm 56, the head arm 54 rotates downward so as to bring an upper surface of the disk-like recording medium D into proximity to the magnetic head 53, thus enabling magneto-optical recording of information to the disk-like recording medium D.

As described above, the cam gear 38 thus has a first rotation region, in which the offset pin 38a moves the slide holder 25 from an insert position to an insert completion position; a second rotation region, in which the offset pin 38a moves the slider 20 from an insert position to a load position; and a third rotation region, in which the offset pin 38a moves the head load plate 22 from an unload position to a load position. As a result, the cam gear 38 can selectively drive the slide holder 25, slider 20 and head load plate 22 depending on the rotation position of the cam gear 38, so one drive motor 62 suffices to retract the disk cartridge C, load the disk cartridge C and lower the magnetic head, thus permitting the number of motors to be reduced.

Further, the cam groove 38b of the cam gear 38 engages the cam engaging tab 20p of the slider 20 and positions the slider 20 in the above-described first rotation region, and engages the engaging member 25k of the slide holder 25 and positions the slide holder 25 in the above-described second and third rotation regions. As a result, two members can be positioned with a single cam, providing the advantage of making the disk drive made more compact and reducing the costs of production as compared to a case in which a positioning cam is provided for each one of the two members.

Figure 24:
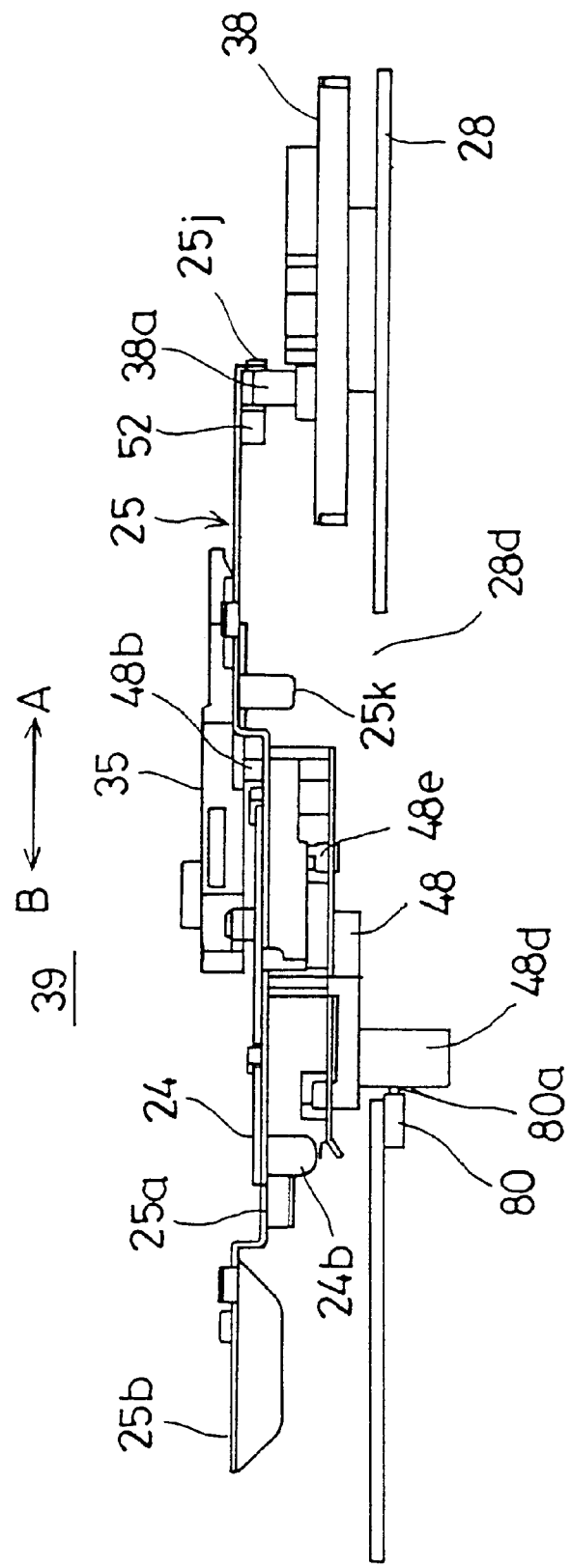
FIG. 24 is a diagram showing a side view of an operating state of a cartridge retraction mechanism before insertion and after ejection of a cartridge.

FIGS. 23A and 23B are diagrams showing an operating state of the cartridge retraction mechanism 39 before insertion and after ejection of a cartridge, respectively. FIG. 24 is a diagram showing a side view of an operating state of a cartridge retraction mechanism before insertion and after ejection of a cartridge.

As shown in FIG. 23A, and as described above with reference to FIG. 11, in the cartridge retraction mechanism 39 in a state of operation prior to insertion of a cartridge or after ejection of a cartridge the load arm 24 is rotated in the direction of arrow F, the pin 24b is inserted into the holder 16, the cartridge hook 48 is rotated in the direction of arrow F and is retained at a position that does not interfere with the insertion of the disk cartridge C.

Additionally, as shown in FIG. 23A, the load cam 35 supported by the holder frame 18 (of which only the lower half is shown in the diagram) comprises guide members 35b, 35c that guide the movement of the contacting pin 24e of the cam load arm 24 and a swing cam 35d rotatably mounted at a position between the guide members 35b, 35c. The left guide member 35b extends substantially in the direction of arrows A, B while the right guide member 35c is bent in substantially an arc along a rotation path of the contacting pin 24e. Accordingly, a space between the guides 35b, 35c widens toward the B-direction side of the load cam 35 and narrows toward an A-direction side of the load cam 35.

The swing cam 35d is rotatably supported by a shaft 35e and urged in a counter-clockwise direction by an urging member not shown in the diagram. A left side surface 35d1 of the swing cam 35d opposing the left guide member 35b is formed in a straight line and a right side surface 35d2 of the swing cam 35d opposing the right guide member 35c is formed in the shape of an arc.

The load cam 35 has a straight member 35f that extends in the direction of arrows A, B.

As shown in FIGS. 23B and 24, the downwardly projecting switch pressing member 48d of the cartridge hook 48 supported on a bottom surface of the slide holder 25 penetrates an opening 28d in the chassis 28 and contacts a contact tab 80a of the motor switch 80 provided on the bottom of the chassis, maintaining the motor switch 80 in an ON state.

Figure 25A:
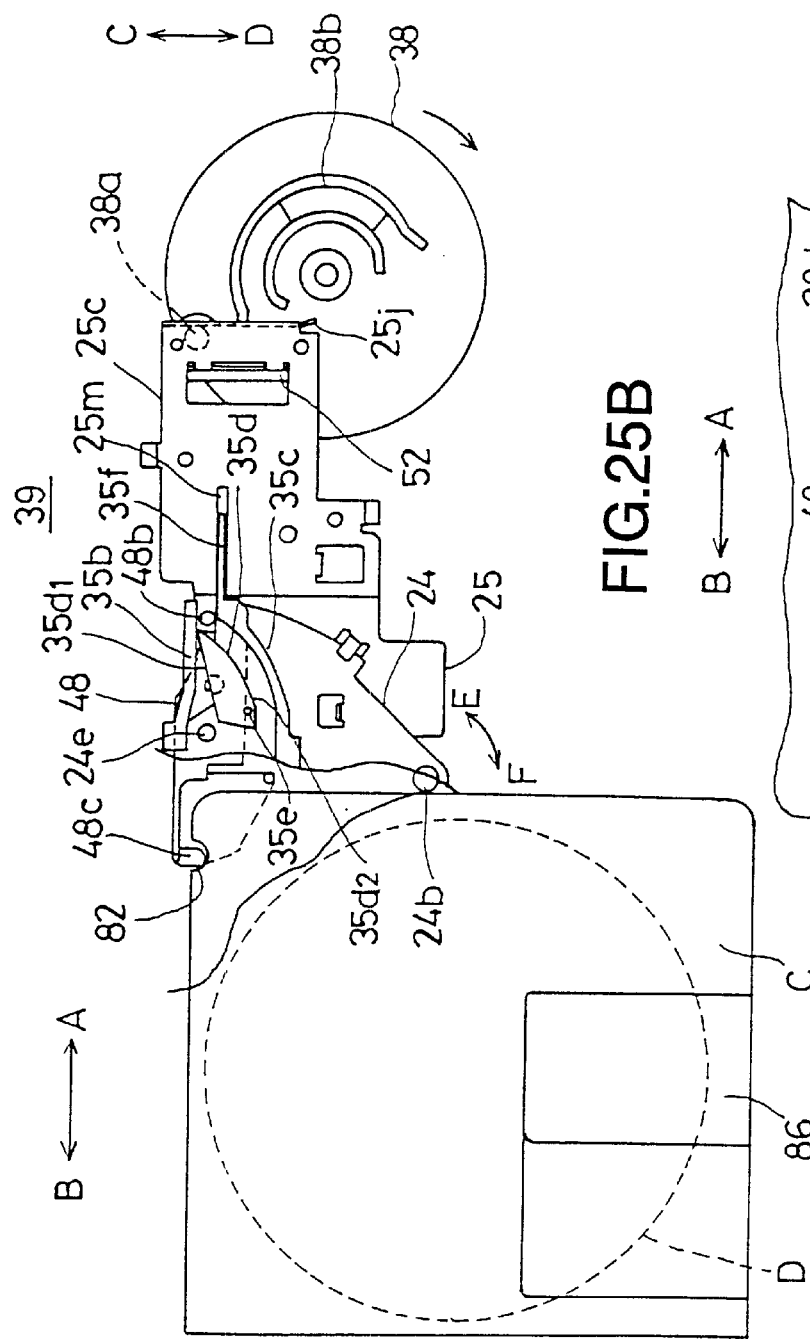
FIGS. 25A and 25B are diagrams showing an operating state of the cartridge retraction mechanism at the beginning of retraction.
Figure 25B:
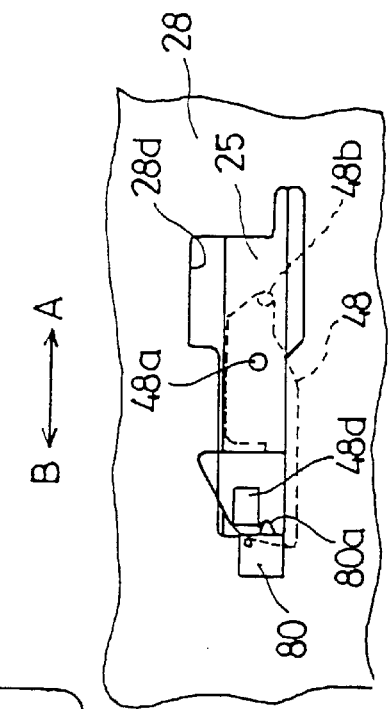

FIGS. 25A and 25B are diagrams showing an operating state of the cartridge retraction mechanism 39 at the beginning of retraction. As shown in FIGS. 25A and 25B, when the disk cartridge C is inserted into the holder 16, pin 24b of the load arm 24 is pressed and the load arm 24 is rotated in the direction of arrow E. At the same time, the cartridge hook 48 rotates in the direction of arrow E, causing the projection 48c to engage the concavity 82 in the disk cartridge C, thus engaging the disk cartridge C and completing the task of putting the disk cartridge C in a transportable state.

Further, the rotation of the cartridge hook 48 in the direction of arrow E separates the downwardly projecting switch pressing member 48d from the contact tab 80a of the motor switch 80 mounted on the bottom of the chassis 28, thus switching the motor switch 80 OFF. As a result, when the switching of the motor switch 80 from ON to OFF is detected by a control circuit not shown in the diagram, a drive signal is output from the control circuit to the drive motor 62 and the drive force of the drive motor 62 is transmitted to the cam gear 38 via the drive mechanism 60.

Figure 26:
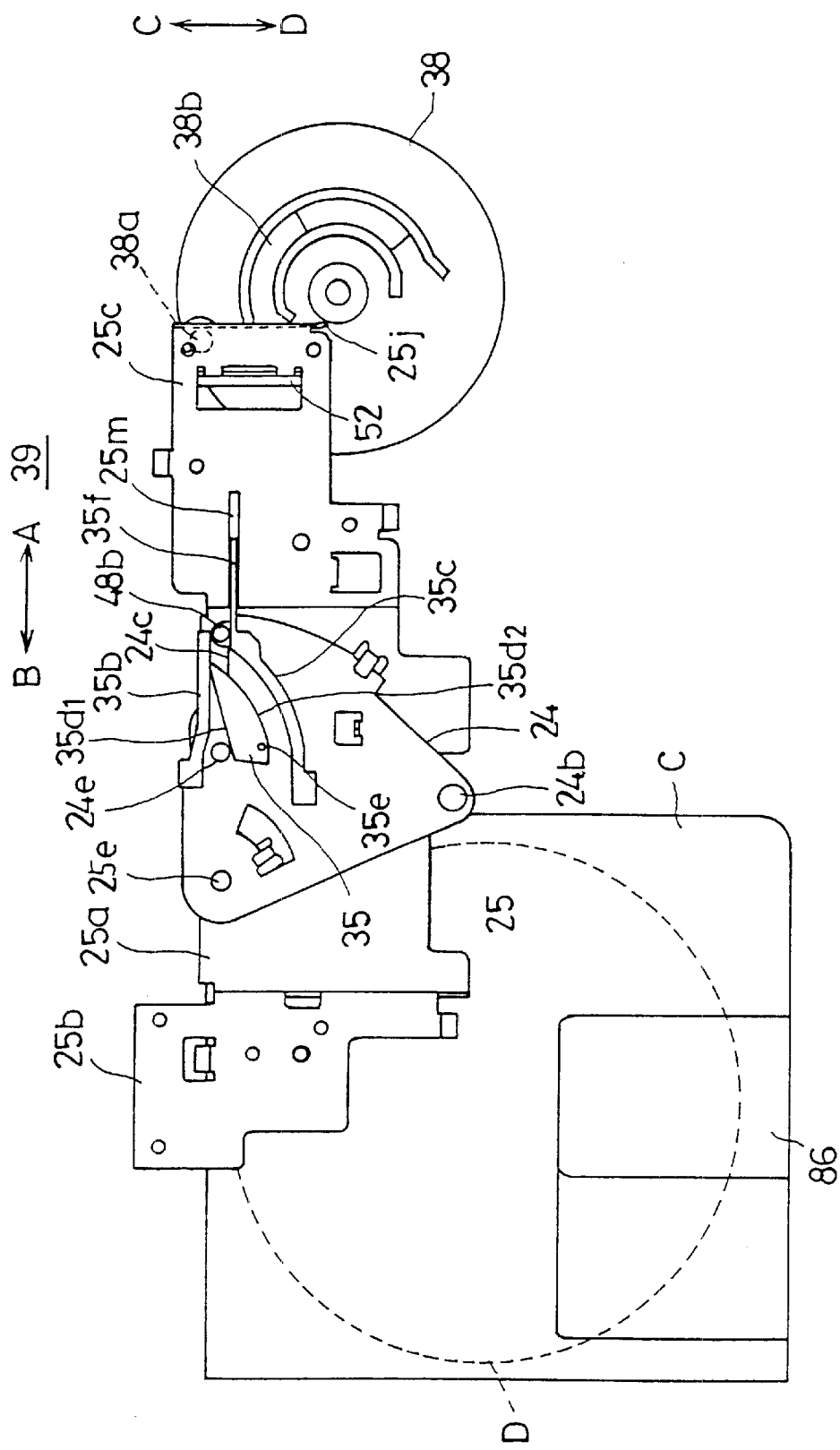
FIG. 26 is a first diagram showing a plan view of an operating state of the cartridge retraction mechanism just after retraction begins.

FIG. 26 is a first diagram showing a plan view of an operating state of the cartridge retraction mechanism 39 just after retraction begins. As shown in FIG. 26, when the cam gear 38 rotates clockwise, as described above the offset pin 38a of the cam gear 38 is engaged between the guide plate 52 of the slide holder 25 and the flange member 25j, so the slide holder 25 is moved in the direction of arrow A.

In such a state, when the disk cartridge C is inserted in the holder 16, the pin 24b of the load arm 24 is pressed and the load arm 24 is rotated in the direction of arrow E. At the same time, the cartridge hook 48 rotates in the direction of arrow E and the motor switch 80 to be described later switches from ON to OFF. As a result, the drive motor 62 is driven and the drive force thereof is transmitted to the cam gear 38 via the drive mechanism 60. Accordingly, the cam gear 38 rotates clockwise from the position shown in FIG. 15 and the offset pin 38a presses the flange member 25j of the slide holder 25 in the direction of arrow A.

As described above, the disk cartridge C engaged by the cartridge hook 48 moves together with the slide holder 25 in the direction of arrow A and is retracted into the holder 16.

At this time, in tandem with the movement of the slide holder 25 the contacting pin 24e of the load arm 24 advances into an area between the left guide member 35b and the left side surface 35d1 of the swing cam 35d.

Figure 27:
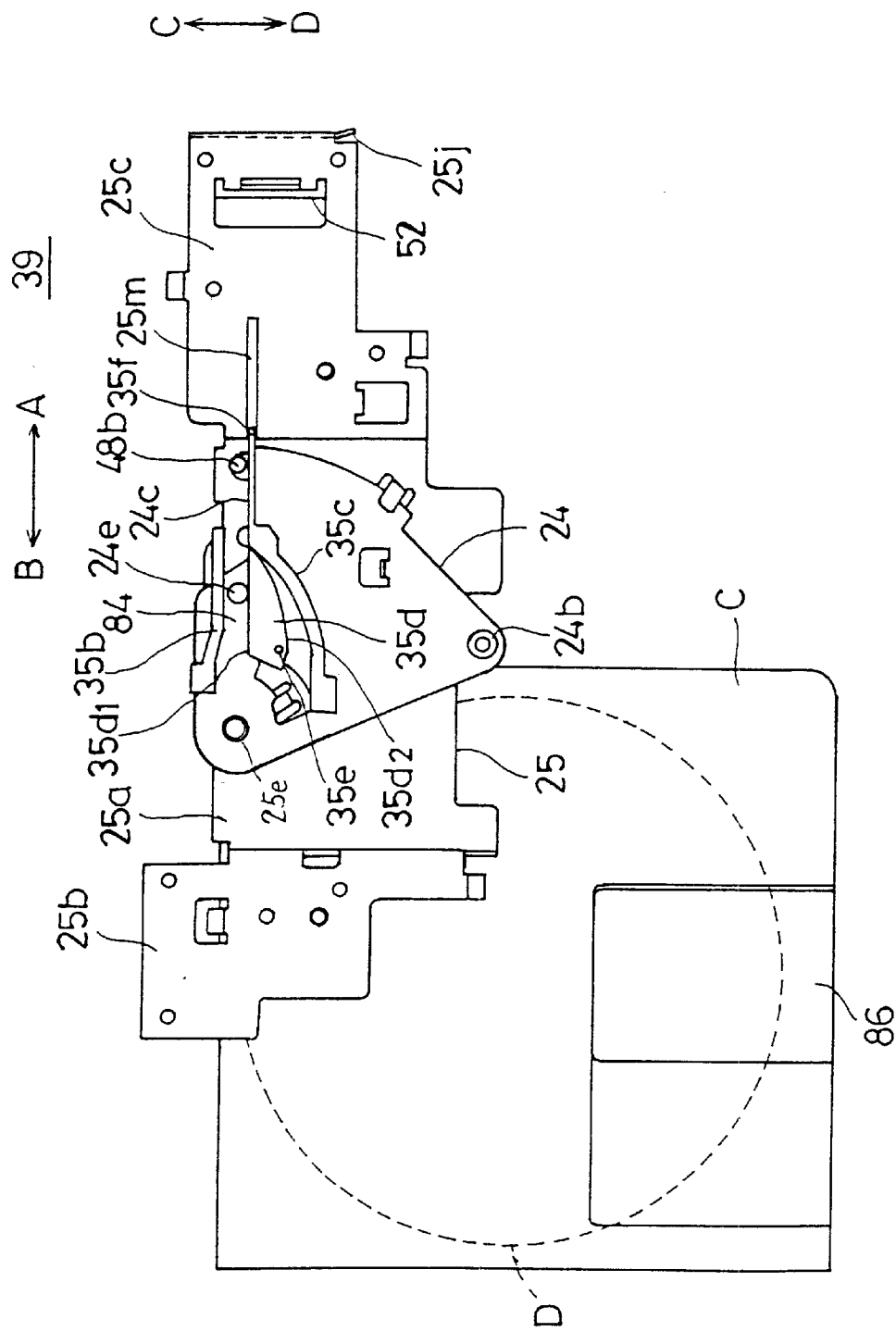
FIG. 27 is a second diagram showing a plan view of an operating state of the cartridge retraction mechanism just after retraction begins.

FIG. 27 is a second diagram showing a plan view of an operating state of the cartridge retraction mechanism 39 just after retraction begins. As shown in FIG. 27, when the cam gear rotates further clockwise, the contacting pin 24e of the load arm 24 presses the left side surface 35d1 of the swing cam 35d while moving in the direction of arrow A. As a result, the swing cam 35d rotates clockwise about the shaft 35e and a front edge portion contacts the left guide member 35c. In such a state, the left side surface 35d1 of the swing cam 35d becomes parallel to the right side guide member 35b to form a passage 84 through which the contacting pin 24e can pass.

Accordingly, the contacting pin 24e of the load arm 24 passes through the passage 84 formed between the left side surface 35d1 of the swing cam 35d and the left guide member 35b in the direction of arrow A. At this time, although the load arm 24 is urged in the direction of arrow F by the coil spring 76, the process of retracting the disk cartridge C causes the swing cam 35d to limit the rotation of the load arm 24 in the direction of arrow F. Accordingly, during retraction the spring force of the coil spring 76 does not act on the disk cartridge C.

Figure 28A:
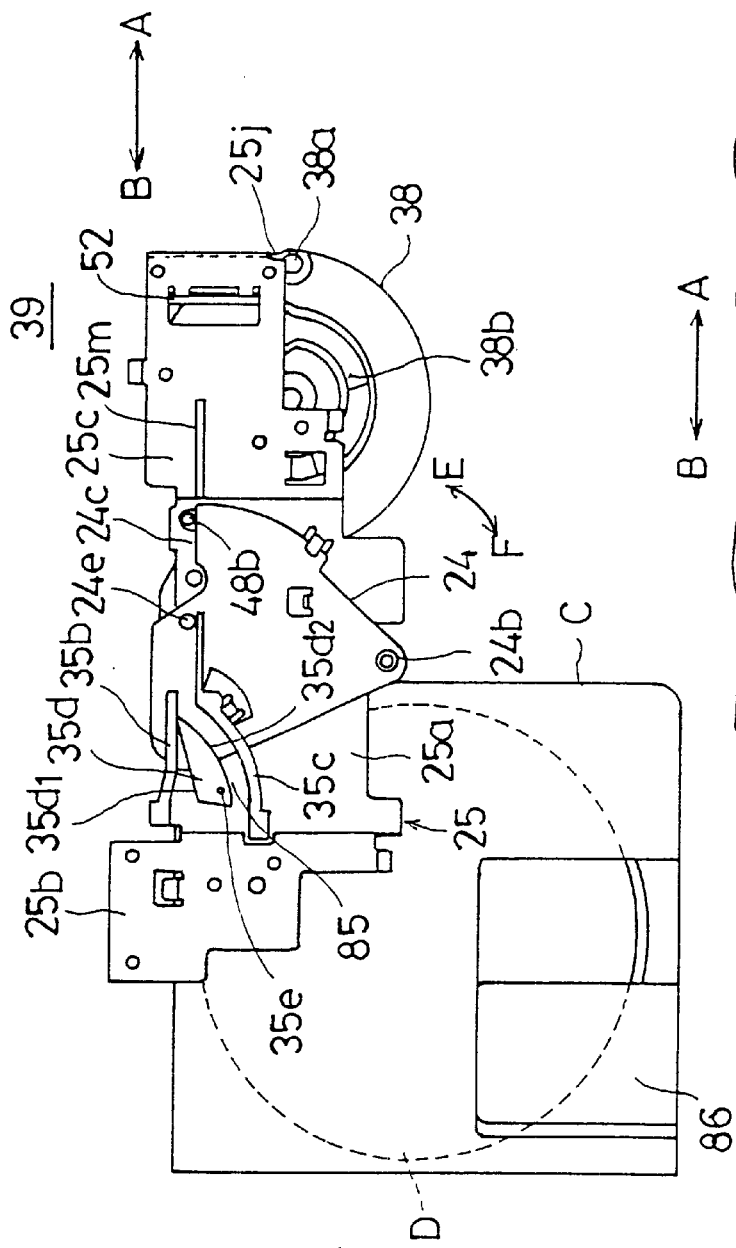
FIGS. 28A and 28B are diagrams showing a plan view and a bottom surface view, respectively, of an operating state of the cartridge retraction mechanism upon completion of retraction.
Figure 28B:
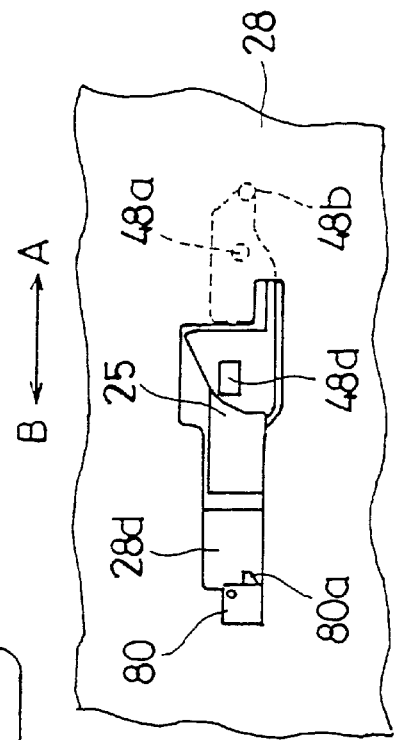

FIGS. 28A and 28B are diagrams showing a plan view and a bottom surface view, respectively, of an operating state of the cartridge retraction mechanism 39 upon completion of retraction. FIG. 29 is a diagram showing a side view of an operating state of the cartridge retraction mechanism 39 upon completion of retraction.

As shown in FIGS. 28A and 28B as well as in FIG. 29, when the disk cartridge C has been completely retracted into the holder 16, the contacting pin 24e of the load arm 24 passes completely through the passage 84 formed between the left side surface 35d1 of the swing cam 35d and the left guide member 35b and at the same time the switch pressing member 48d of the cartridge hook 48 reaches a position fully separated from the contact tab 80a of the motor switch 80. Additionally, during the process of retraction the retention of the shutter 86 of the disk cartridge C is released and the disk-like recording medium D sealed within the disk cartridge C is disposed so as to oppose the optical pick-up 32 and the magnetic head 53.

Additionally, the swing cam 35d returns to an original position from which a forward edge portion thereof is made to contact the left guide member 35b, closing off the passage 84 and at the same time forming a passage 85 between the right side surface 35d2 and the right guide member 35c. This passage 85 exists in order to permit the contacting pin 24e of the load arm 24 to pass during ejection of the disk cartridge C.

It should be noted that the cam gear 38 continues to be driven in the clockwise direction even after retraction is completed, causing the slide holder 25 to slide in the direction of arrow A and at the same time causing the slider 20 to move in the direction of arrow B. As a result, as shown in FIG. 13, when the slider 20 moves in the direction of arrow B the engaging pins 18d of the holder frame 18 descend along the slanted slots 20j of the slider 20, thus lowering the holder 16 and the disk cartridge C to a load position. When the arrival of the holder 16 at the load position is detected by a detection switch not shown in the diagram the drive motor 62 stops.

As shown in FIG. 29, the above-described cartridge hook 48 switch pressing member 48d and the slide holder 25 engaging member 25k are downwardly movable so as not to interfere with the descent of the holder frame 18 to the predetermined load position.

Figures 30A, 30B:
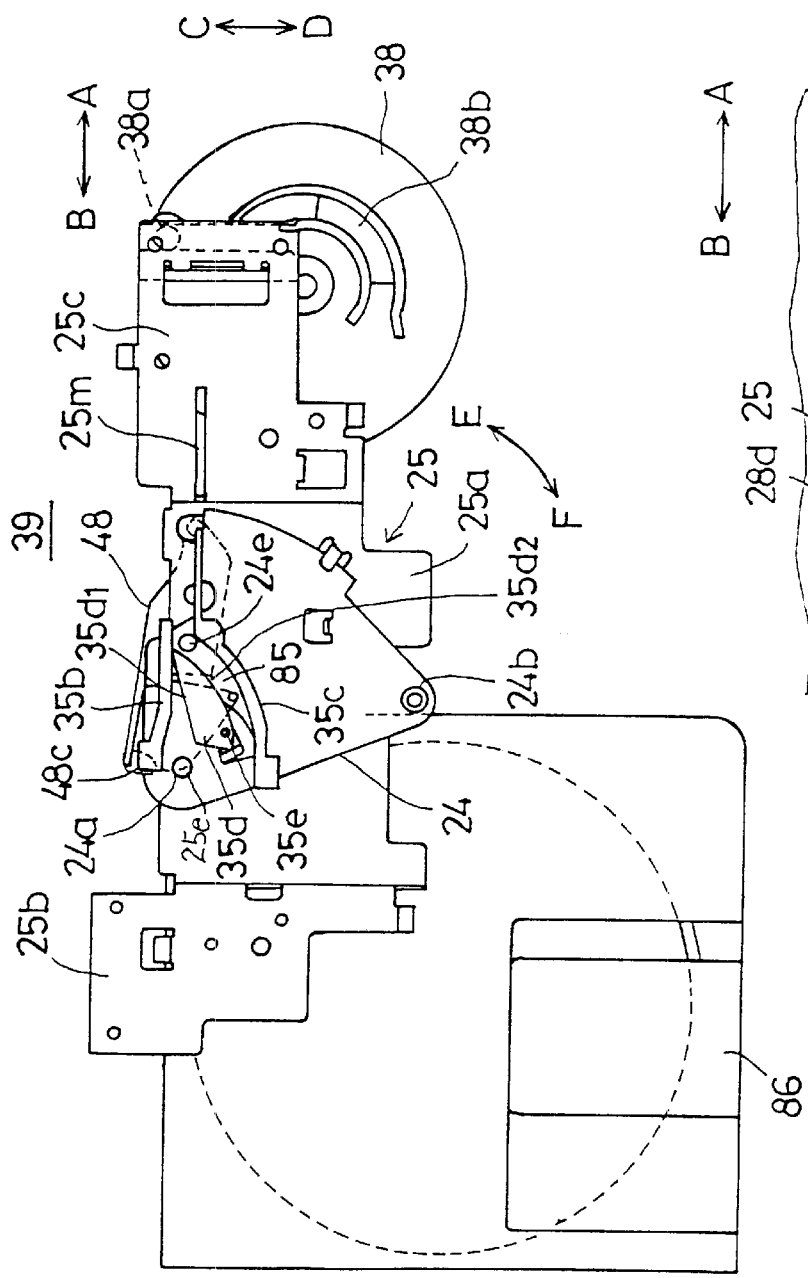
FIGS. 30A and 30B are diagrams showing plan and bottom surface views, respectively, of an eject operating state.

FIGS. 30A and 30B are diagrams showing plan and bottom surface views, respectively, of an eject operating state. As shown in FIGS. 30A and 30B, when an eject switch not shown in the diagrams is pressed the drive motor 62 is rotatably driven in a direction opposite that during insertion of a disk cartridge C. As a result, the cam gear 38 is rotated counter-clockwise and slider 20 engaged by the offset pin 38a slides in the direction of arrow A, after which the cam gear 38 is rotated counter-clockwise and the slide holder 25 engaged by the offset pin 38a slides in the direction of arrow B.

When the slider 20 moves in the direction of arrow A as described above, the engaging pins 18d of the holder frame 18 rise along the slanted slots 20j of the slider 20 as shown in FIG. 12, causing the holder 16 and the disk cartridge C to together rise to an insert position.

Further, when the cam gear 38 is rotated counter-clockwise, an operation that is the reverse of the above-described disk retraction operation is carried out as an eject operation, or ejection. Additionally, as the ejection causes the slide holder 25 to slide in the direction of arrow B, the contacting pin 24e of the load arm 24 passes through the arc-shaped passage 85 formed between the right side surface 35d2 of the swing cam 35d and the right guide member 35c.

As a result, the load arm 24 is rotated in the direction of arrow F by the force of the coil spring 76, thus causing the pin 48b of the cartridge hook 48 to contact the edge member 24c of the load arm 24, as a result of which the cartridge hook 48 rotates in the same F direction as the load arm 24, with the projection 48c separating from the concavity 82 formed in the disk cartridge C and thereby releasing the disk cartridge C. After the disk cartridge C has been released the pin 24b of the load arm 24 pushes the disk cartridge C in the direction of an eject (that is, the direction of arrow B) while itself rotating in the direction of arrow F.

As described above the disk cartridge C is ejected from the holder 16 in the direction of arrow B. The switch pressing member 48d of the cartridge hook 48 that is supported on the bottom of the slide holder 25 then contacts the contact tab 80a of the motor switch 80, switching the motor switch from OFF to ON.

Additionally, the previously described control circuit not shown in the diagram stops the drive motor 62 when the motor switch 80 switches ON, thus completing ejection of the disk cartridge C.

As described above, the drive motor 62 is rotatably driven by the switching of the motor switch 80 from ON to OFF, and at the same time the drive motor 62 can be stopped by switching the motor switch 80 from OFF to ON. Accordingly, the motor switch 80 functions as a retraction detection switch as well as an eject stop detection switch, thus replacing these two switches with one switch and thereby reducing the number of component parts.

A description will now be given of the ejection of the disk cartridge C and the closing of the shutter 86.

Figure 31:
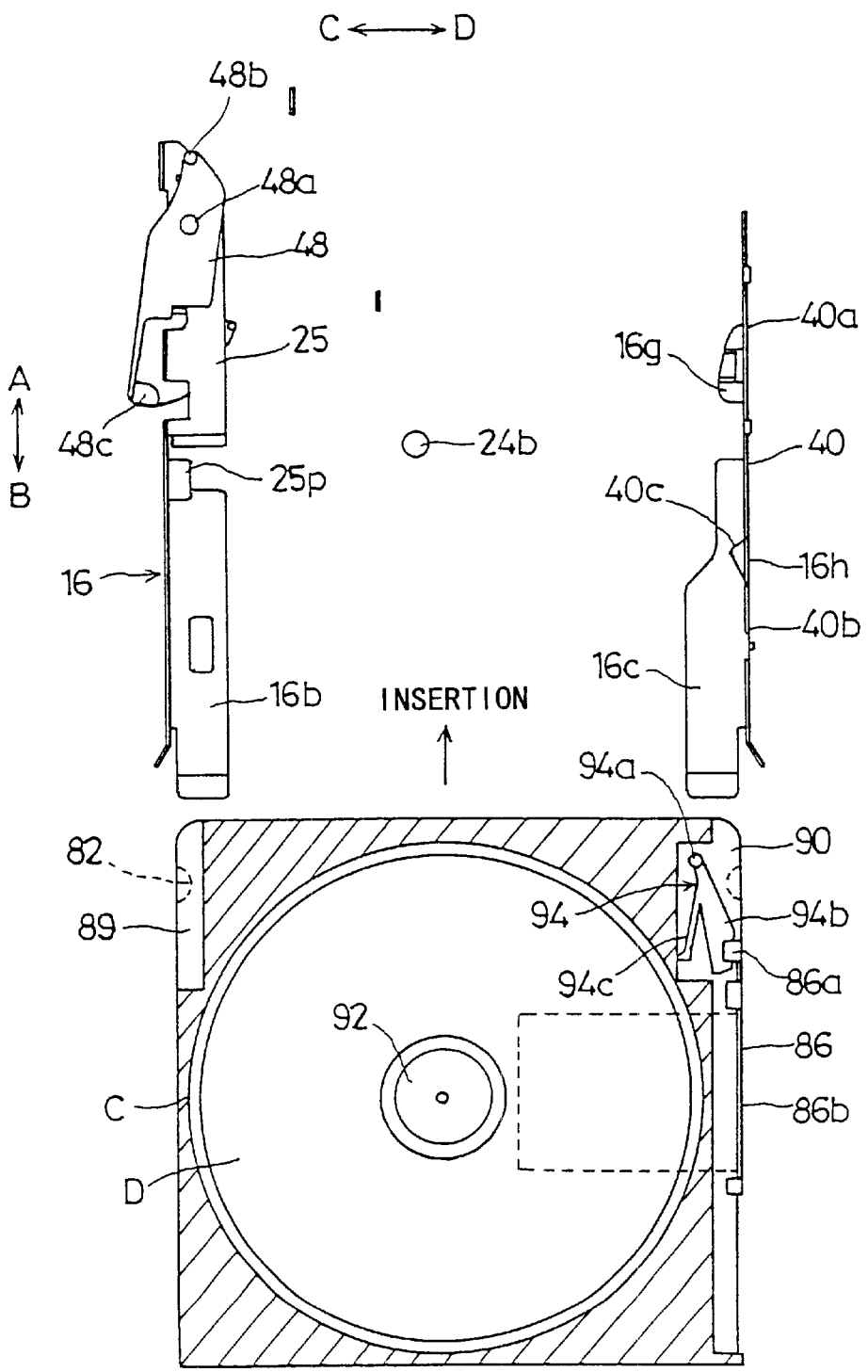
FIG. 31 is a diagram showing a plan view of a state before insertion of a disk cartridge C.

FIG. 31 is a diagram showing a plan view of a state before insertion of a disk cartridge C. As shown in FIG. 31, the disk cartridge C has grooves 89, 90 extending along left and right sides in the direction of arrows A, B, with the disk cartridge C being inserted in the holder 16 so that the shutter 86 is positioned at a right side thereof. Additionally, the holder 16 has cartridge guides 16b, 16c for guiding both sides of the disk cartridge C. Additionally, a prevent tab 25p for preventing the disk cartridge C from being incorrectly inserted is formed on the slide holder 25 so as to project into an inside of the left cartridge guide 16b.

The prevent tab 25p is integrally formed as a single unit with the slide holder 25 that is movably included within the cartridge retraction mechanism 39, providing the advantage of a more compact device at reduced cost.

Additionally, the cartridge hook 48 is rotatably supported at the back of the prevent tab 25p. Additionally, a holder spring 40 retaining the shutter 86 is provided on the right cartridge guide member 16c of the holder 16.

A shutter drive tab (shutter drive member) 16g that closes the shutter 86 of the disk cartridge C by the insertion of the disk cartridge C projects from the right cartridge guide member 16c. Additionally, a window 16h for the purpose of permitting the projection 48c of the holder spring 40 to enter into the interior of the holder 16 is also provided on the right cartridge guide member 16c.

As noted previously, a disk-like recording medium D is contained within the disk cartridge C. A hub 92 to be clamped to the turntable 30 is provided at the center of the disk-like recording medium D. Additionally, the concavity 82 which the projection 48c of the cartridge hook 48 engages is formed on a left side surface of the disk cartridge C.

Additionally, in the groove 90 provided on the right side surface thereof, the disk cartridge C has a shutter lock arm 94 that retains the shutter 86 at a closed position. The shutter lock arm 94 comprises a shaft 94a about which the shutter lock arm 94 rotates, an engaging member 94b that engages an engaging projection 86a, and a spring member 94c that contacts an interior wall of the groove 90 and urges an engaging member 42b toward the engaging projection 86a.

Additionally, a hole 86b into which the projection 40c of the holder spring 40 is formed on a side surface of the shutter 86.

Figure 32:
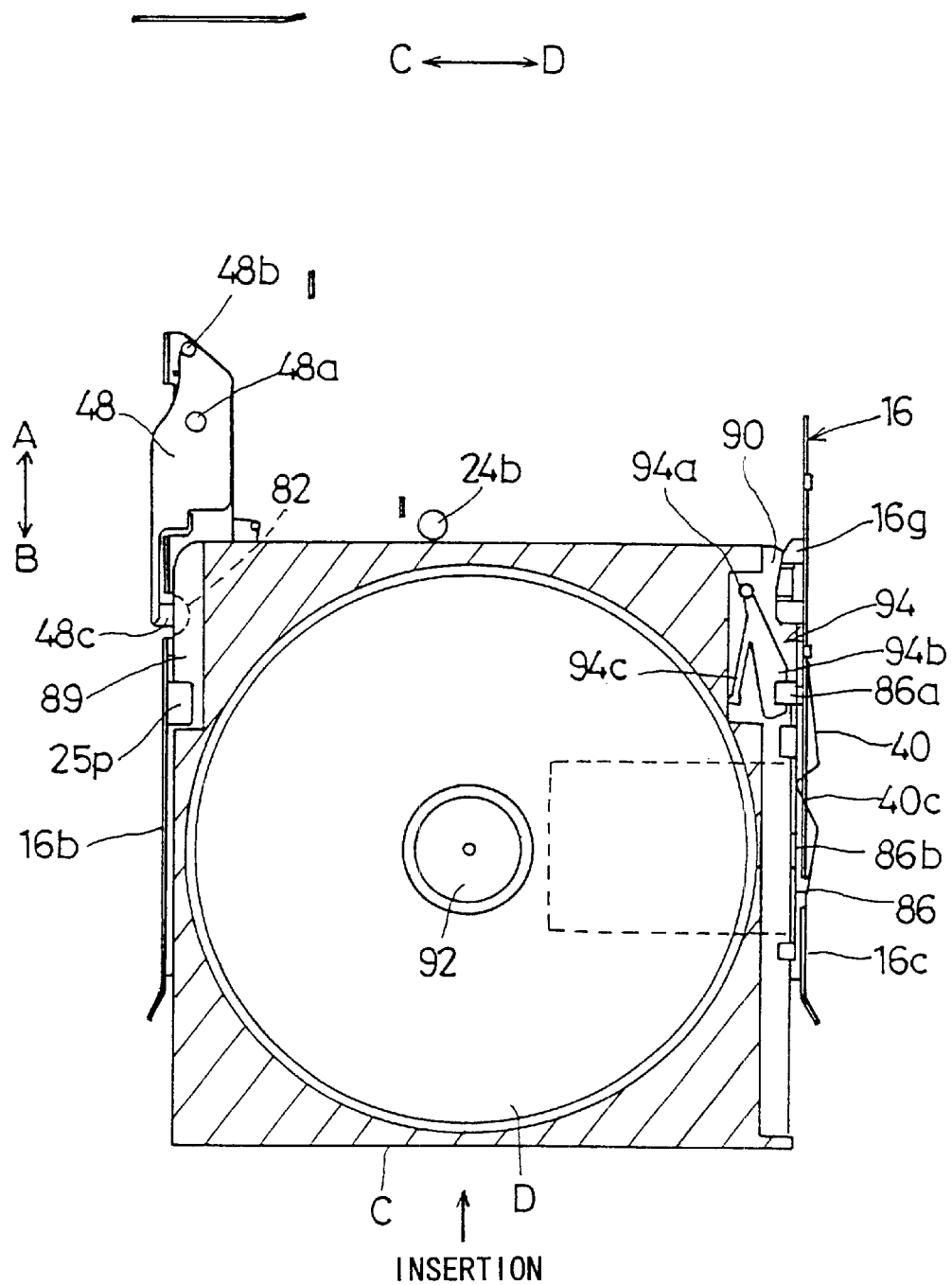
FIG. 32 is a diagram showing a plan view of a state in which retraction of a disk cartridge C has commenced.

FIG. 32 is a diagram showing a plan view of a state in which retraction of a disk cartridge C has commenced. As shown in FIG. 32, when the disk cartridge C is properly inserted, the prevent tab 25p that projects into the interior of the left cartridge guide member 16b enters the groove 89 of the disk cartridge C. It should be noted that in the event that the disk cartridge C is inserted improperly, the prevent tab 25p contacts the disk cartridge C, preventing the entry of the disk cartridge C.

When the disk cartridge C is pressed in the direction of insertion, the pin 24b of the load arm 24 is pressed and the load arm 24 begins to rotate in the direction of arrow E. In so doing, the pin 48b of the cartridge hook 48 contacts the edge member 24c of the load arm 24, thus causing the cartridge hook 48 to rotate in the same direction. As a result, the projection 48c of the cartridge hook 48 engages the concavity 82 of the disk cartridge C, thus retaining the disk cartridge C.

At this time, the shutter drive tab 16g separates from the shutter lock arm 94 and the shutter 86 is retained at a closed position by the shutter lock arm 94. Additionally, the projection 40c of the holder spring 40 contacts the shutter 86 and displaces to the right, that is, in a direction indicated by arrow D.

Before retraction begins and the disk cartridge C is being inserted manually, the shutter 86 of the disk cartridge C does not open, so the disk cartridge C can be inserted smoothly, and further, can be inserted into the holder 16 with no unpleasant sensation.

Additionally, the rotation of the cartridge hook 48 in the direction of arrow E turns the above-described motor switch 80 OFF, thus rotatably driving the motor 62. The rotational drive force of the drive motor 62 is then transmitted to the cam gear 38 and the retraction of the disk cartridge C begins.

Figure 33:
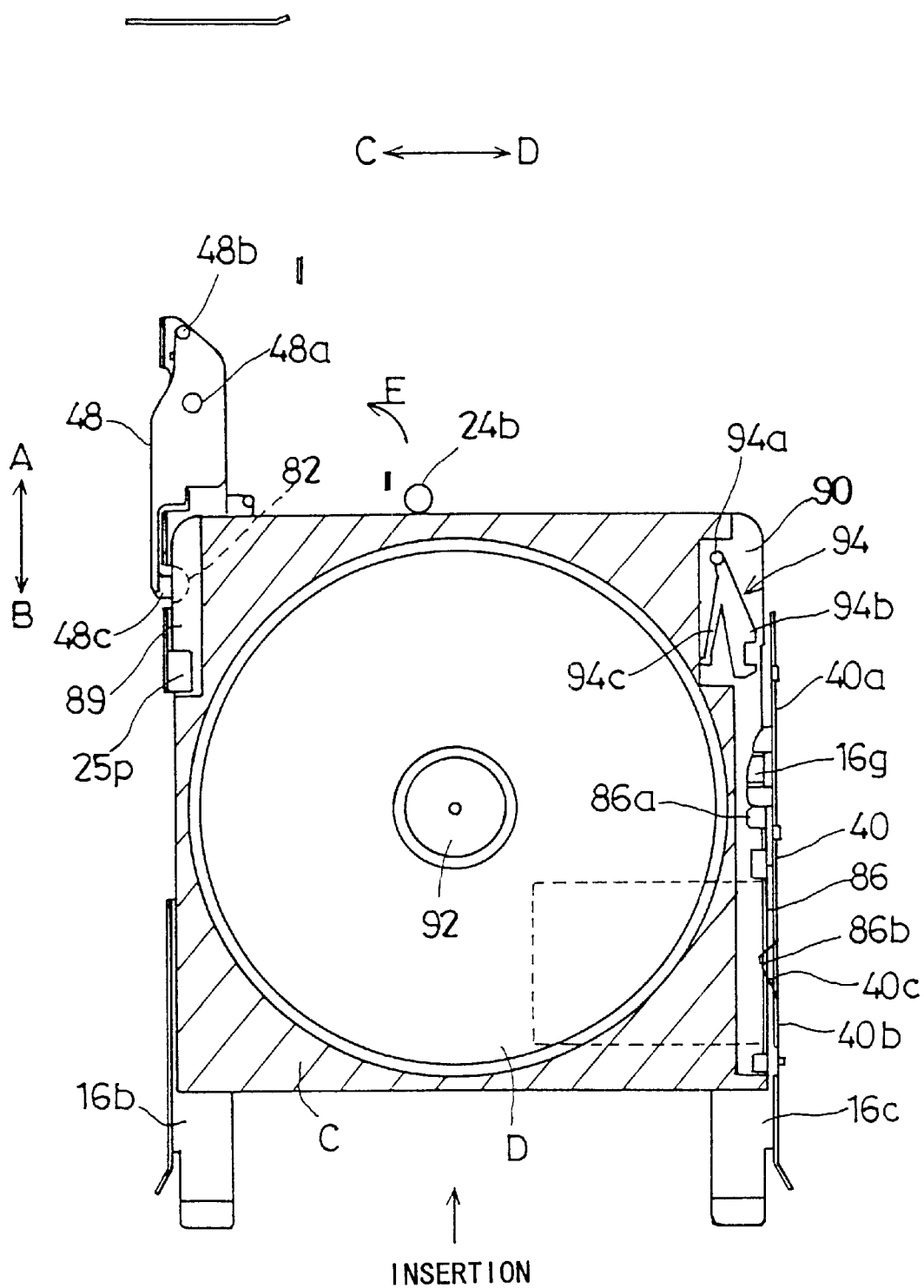
FIG. 33 is a diagram showing a plan view of a state in which retraction of a disk cartridge C is completed and the disk cartridge C is ready for recording and/or reproducing information.

FIG. 33 is a diagram showing a plan view of a state in which retraction of the disk cartridge C is completed and the disk cartridge C is ready for recording and/or reproducing information. As shown in FIG. 33, as the slide holder 25 slides, the disk cartridge C retained by the projection 48c of the cartridge hook 48 is retracted into the holder 16 and the shutter drive tab 16g deforms so as to separate the engaging member 94b of the shutter lock arm 94 from the engaging projection 86a of the shutter 86.

Additionally, the shutter drive tab 16g releases the retention of the shutter lock arm 94 and contacts the shutter 86. As a result, the insertion of the disk cartridge C opens the shutter 86 relative to the disk cartridge C. Additionally, the projection 40 of the holder spring 40 engages the hole 86b of the shutter 86.

In this manner, after the shutter drive tab 16g releases the retention of the shutter lock arm 94 the shutter 86 contacts the shutter drive tab 16g and opens. As a result, when the holder 16 reaches a predetermined position, the disk-like recording medium D contained inside the disk cartridge C is disposed opposite the pick-up 43 and the magnetic head 53, enabling recording and/or reproduction of information to and from the disk-like recording medium D.

The prevent tab 25p remains inside the disk cartridge C groove 89 and moves together with the slide holder 25 in the direction of insertion so as not to interfere with the retraction of the disk cartridge C.

Figure 34:
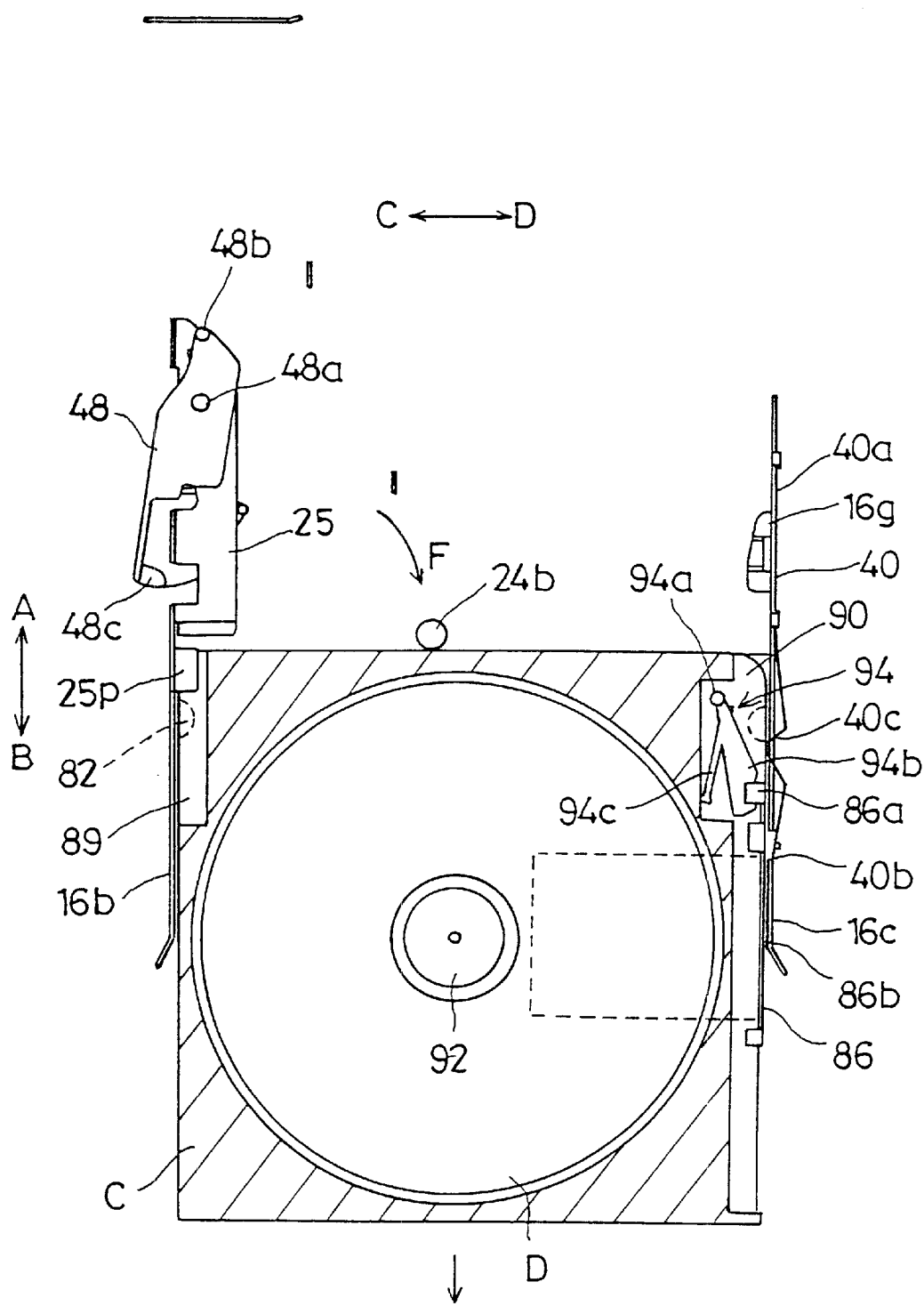
FIG. 34 is a diagram showing a state in which ejection of the disk cartridge C is completed.

FIG. 34 is a diagram showing a plan view of a state in which an eject operation of the disk cartridge C is completed. As shown in FIG. 34, when an eject switch not shown in the diagram is turned ON, as described previously the drive motor 62 is rotated in a direction that is the reverse of the direction in which the drive motor 62 is rotated when the disk cartridge C is inserted. As a result, when the cam gear 38 is rotated counter-clockwise the slider 20 engaged by the offset pin 38a slides in the direction of arrow A, after which the cam gear 38 is rotated counter-clockwise, thus causing the slide holder 25 engaged by the offset pin 38a to slide in the direction of arrow B.

Additionally, attendant upon the slider holder 25 sliding in the direction of arrow B by the ejection of the disk cartridge C, the load arm 24 rotates in the direction of arrow F, as a result of which the projection 48c of the cartridge hook 48 separates from the concavity 82 of the disk cartridge C. Additionally, the rotation of the load arm 24 in the direction of arrow F causes the contacting pin 24b of the load arm 24 to eject the disk cartridge C in the direction of arrow B.

In the above-described ejection process, the projection 40c of the holder spring 40 engages the hole 86b of the shutter 86, so the shutter 86 is engaged by the holder spring 40 and the disk cartridge C is moved in the direction of ejection, that is, the direction of arrow B, in the process of which the shutter closes with respect to the disk cartridge C.

The above-described mechanization of the closing of the shutter 86 during ejection of the disk cartridge C can be made more secure and more stable than is the case when the shutter 86 is closed by manual removal of the disk cartridge C.

Additionally, when ejection is completed, the shutter 86 is closed and the holder spring 40 slips out of the hole 86b of the shutter 86, thus improving the sensation imparted to the operator's hand during manual removal of the disk cartridge C thereafter.

It should be noted that the disk cartridge C can be ejected to a position further in the direction of arrow B than the position of the disk cartridge C at the beginning of retraction during insertion, making it easier to grasp and remove the disk cartridge C from the disk drive.

Figure 35:
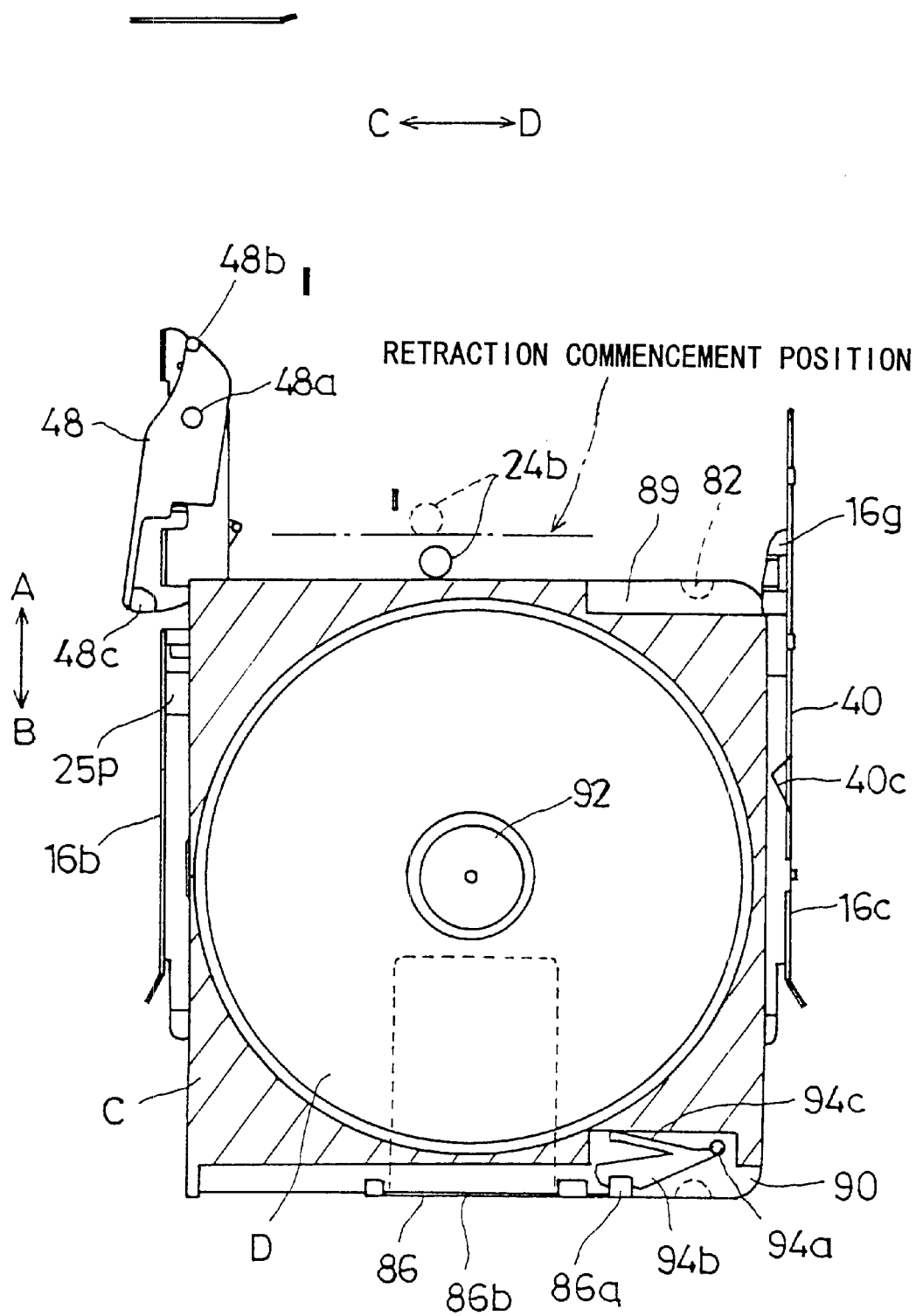
FIG. 35 is a diagram showing a plan view of an operation preventing improper insertion of the disk cartridge C.

FIG. 35 is a diagram showing a plan view of the operation of preventing the improper insertion of the disk cartridge C. As shown in FIG. 35, in the event that for example the disk cartridge C is inserted into the holder 16 in a state in which the disk cartridge C is rotated 90° from the proper direction, a width of the disk cartridge C is smaller than a width of the holder 16, so the left side surface of the disk cartridge C slidingly contacts the prevent tab 25p and the disk cartridge C is moved to the right. In this case, the groove 89 is provided on an edge member of the inserted side of the disk cartridge C, and this groove 89 engages the shutter drive tab 16g provided on the right side cartridge guide member 16c.

As a result, insertion of the disk cartridge C in an improper direction is prevented by the shutter drive tab 16g. In this case, although the shutter drive tab 16g engages the groove 89, the front edge of the disk cartridge C stops at a predetermined distance in front of the position at which retraction begins and hence retraction does not begin.

Additionally, in the event that the disk cartridge C is inserted in the holder 16 in a state in which the disk cartridge C is rotated 180° from the proper direction, the width of the disk cartridge C is substantially the same as the width of the holder 16. As a result, the edge member of the side of the disk cartridge C inserted into the holder 16 contacts the prevent tab 25p and thus halts insertion of the disk cartridge C in the holder 16 at a point prior to the point at which insertion of the disk cartridge C is halted.

The prevent tab 25p prevents insertion of the disk cartridge C when the disk cartridge C in inserted into the holder 16 in a direction other than a predetermined direction. When the disk cartridge C is inserted in the predetermined direction, the retraction action of the cartridge retraction mechanism 39 moves the disk cartridge C in the direction of insertion, thereby mitigating the depth direction of the holder 16 and so securing design flexibility.

By providing a construction in which the prevent tab 25p is linked with the cartridge retraction mechanism 39 and moves in the direction of insertion, the need for a special drive mechanism for the purpose of driving the prevent tab 25p in the direction of insertion is eliminated, and accordingly, the device can be made more compact and the cost of production reduced.

Figure 1:
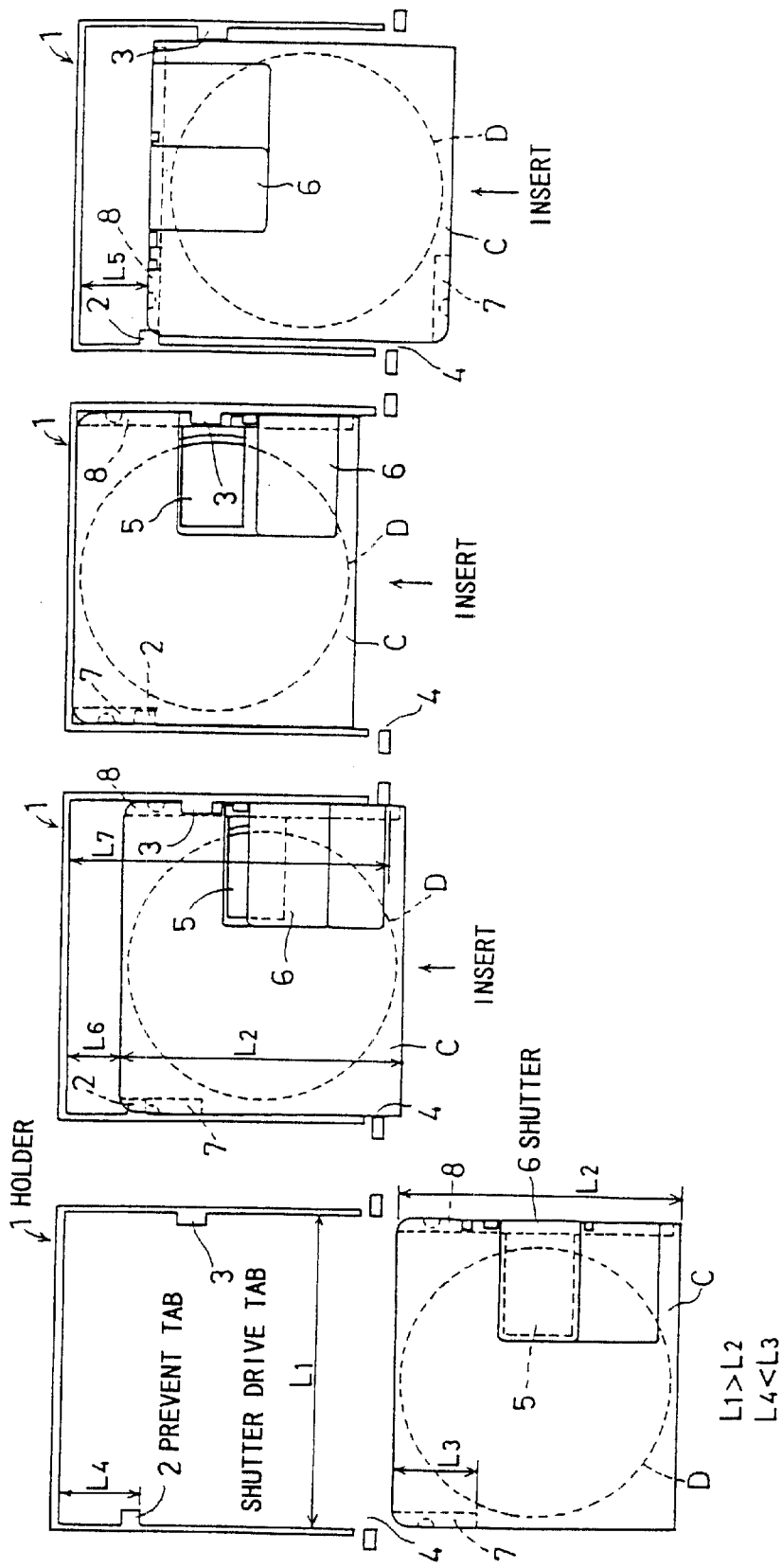
FIGS. 1A, 1B, 1C and 1D are process diagrams for the purpose of explaining the conventional mechanism for preventing a disk cartridge from being improperly inserted into a holder, hereinafter referred to as a prevent mechanism.

Additionally, conventionally, as described previously, the distance from the back wall of the holder to the position of the prevent tab, which is given as L4 in FIG. 1, has been limited by the grooves 89 (7) of the disk cartridge C and as a result the detection of an improper insertion of the disk cartridge C has been delayed. In the present invention, however, by providing a construction in which the prevent tab 25p is linked with the cartridge retraction mechanism 39 and moves in the direction of insertion, the distance from the back wall of the holder 16 to the position of the prevent tab 25p is not limited by the grooves 89 of the disk cartridge C, and accordingly, an improper insertion of the disk cartridge C can be detected earlier than is the case conventionally and the position at which retraction by the retraction mechanism begins can be placed closer to the front of the unit.

By being able to place the position at which retraction by the retraction mechanism begins closer to the front of the unit as described above, the distance through which the disk cartridge C is retracted by the cartridge retraction mechanism 39 can be lengthened, and accordingly, the opening and closing of the shutter takes place not during an interval in which the disk cartridge C is moved manually but during an interval in which the disk cartridge C is moved mechanically by the cartridge retraction mechanism 39.

It should be noted although the foregoing embodiment is described with reference to an optical disk device, the invention is of course not limited to such an embodiment but can be adapted to other disk drives as well as to a recording/reproduction device for recording/reproducing information to and from a memory card or other card-like recording medium.

The above description is provided in order to enable any person skilled in the art to make and use the invention and sets forth the best mode contemplated by the inventor of carrying out the invention.

The present invention is not limited to the specifically disclosed embodiments, and variations and modifications may be made without departing from the scope and spirit of the present invention.

The present application is based on Japanese Priority Application No. 11-158588 filed on Jun. 4, 1999, the entire contents of which are hereby incorporated by reference.

What is claimed is:

1. A recording medium loading device comprising:
   a holder into which a cartridge containing a disk shape recording medium is inserted from a predetermined side;
   a cartridge retraction mechanism that retracts the cartridge when the cartridge is inserted to an insertion detection position inside the holder;
   a shutter drive tab which comes in contact with a shutter of the cartridge, and opens the shutter as the cartridge is inserted; and
   a prevent mechanism which includes a prevent tab provided on an interior side of the holder so as to prevent insertion of the cartridge before the cartridge reaches the insertion detection position when the cartridge is inserted from a side other than the predetermined side, said prevent tab being moved relative to said shutter drive tab in a direction of insertion of the cartridge by the cartridge retraction mechanism when the cartridge is inserted from the predetermined side.

2. The recording medium loading device as claimed in claim 1, wherein the shutter drive tab is provided on an interior side of the holder other than the interior side on which the prevent tab is provided, the shutter drive tab contacting the shutter after the cartridge has passed the insertion detection position and opening the shutter relative to the cartridge as the cartridge is inserted.

3. The recording medium loading device as claimed in claim 1, further comprising:
   detecting means detecting insertion of the recording medium cartridge to the insertion detection position and emitting a signal; and
   driving means driving the cartridge retraction mechanism and the prevent tab in response to the signal emitted by the detecting means indicating that the recording medium cartridge is inserted to the insertion detection position and displacing the cartridge retraction mechanism and the prevent tab in a direction of insertion of the recording medium cartridge.

4. A recording medium loading device comprising:
   a holder into which a cartridge containing a disk-shape recording medium is inserted from a predetermined side;
   a cartridge retraction mechanism that retracts the cartridge when the cartridge is inserted to an insertion detection position inside the holder;
   a shutter drive tab which comes in contact with a shutter of the cartridge, and opens the shutter as the cartridge is inserted; and
   a prevent mechanism which includes a prevent tab provided on an interior side of the holder so as to prevent insertion of the cartridge before the cartridge reaches the insertion detection position when the cartridge is inserted from a side other than the predetermined side, said prevent tab being moved relative to said shutter drive tab in association with the cartridge retraction mechanism when the cartridge is inserted from the predetermined side.

5. The recording medium loading device as claimed in claim 4, wherein the shutter drive tab is provided on an interior side of the holder other than the interior side on which the prevent tab is provided, the shutter drive tab contacting the shutter after the cartridge has passed the insertion detection position and opening the shutter relative to the cartridge as the cartridge is inserted.

6. The recording medium loading device as claimed in claim 4, further comprising:
   detecting means detecting insertion of the recording medium cartridge to the insertion detection position and emitting a signal; and
   driving means driving the cartridge retraction mechanism and the prevent tab in response to the signal emitted by the detecting means indicating that the recording medium cartridge is inserted to the insertion detection position and displacing the cartridge retraction mechanism and the prevent tab in a direction of insertion of the recording medium cartridge.

* * * * *